(12) United States Patent
McGuire et al.

(10) Patent No.: US 10,824,055 B1
(45) Date of Patent: Nov. 3, 2020

(54) MODULAR IMAGING SYSTEM

(71) Applicant: Amazon Technologies, Inc., Seattle, WA (US)

(72) Inventors: Jonathan McGuire, Seattle, WA (US); Barry O'Brien, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/140,297

(22) Filed: Sep. 24, 2018

(51) Int. Cl.
| | |
|---|---|
| *G03B 17/56* | (2006.01) |
| *G06T 7/55* | (2017.01) |
| *F21S 4/28* | (2016.01) |
| *H04N 5/235* | (2006.01) |

(52) U.S. Cl.
CPC .............. *G03B 17/561* (2013.01); *F21S 4/28* (2016.01); *G06T 7/55* (2017.01); *H04N 5/2354* (2013.01)

(58) Field of Classification Search
CPC ..................................... F21S 4/28; G06T 7/55
See application file for complete search history.

(56) References Cited

U.S. PATENT DOCUMENTS

| | | | | |
|---|---|---|---|---|
| 5,262,815 | A * | 11/1993 | Aumiller | H04N 5/2252 348/E5.026 |
| 7,680,401 | B1 * | 3/2010 | Adelstein | G03B 15/06 396/1 |
| 9,429,817 | B1 * | 8/2016 | Harder | G03B 17/53 |
| 9,742,991 | B2 * | 8/2017 | Latorre | H04N 5/23229 |
| 2005/0195216 | A1 * | 9/2005 | Kramer | G06F 3/14 345/619 |
| 2019/0212135 | A1 * | 7/2019 | Basler | G01B 11/2545 |
| 2019/0371059 | A1 * | 12/2019 | Toubal | G06T 13/40 |

\* cited by examiner

*Primary Examiner* — Clayton E. LaBalle
*Assistant Examiner* — Dennis Hancock
(74) *Attorney, Agent, or Firm* — Lee & Hayes, P.C.

(57) ABSTRACT

An example modular imaging system may include at least a modular imaging enclosure and a power supply. The modular imaging enclosure may include multiple panels coupled together to define an interior space of the modular imaging enclosure where an object may be placed in order to obtain image data relating to the object. Individual ones of the panels may include imaging panels having one or more light emitting elements, an array of cameras, and a panel computer. The power supply can supply power to these electronic components so they can operate to capture images of an object in appropriate lighting. The modular nature of the imaging system allows for easy packaging and shipment, as well as easy setup and teardown to use the imaging system, making it an easily transportable device that can be easily transported to the location of an object(s) to be imaged.

25 Claims, 14 Drawing Sheets

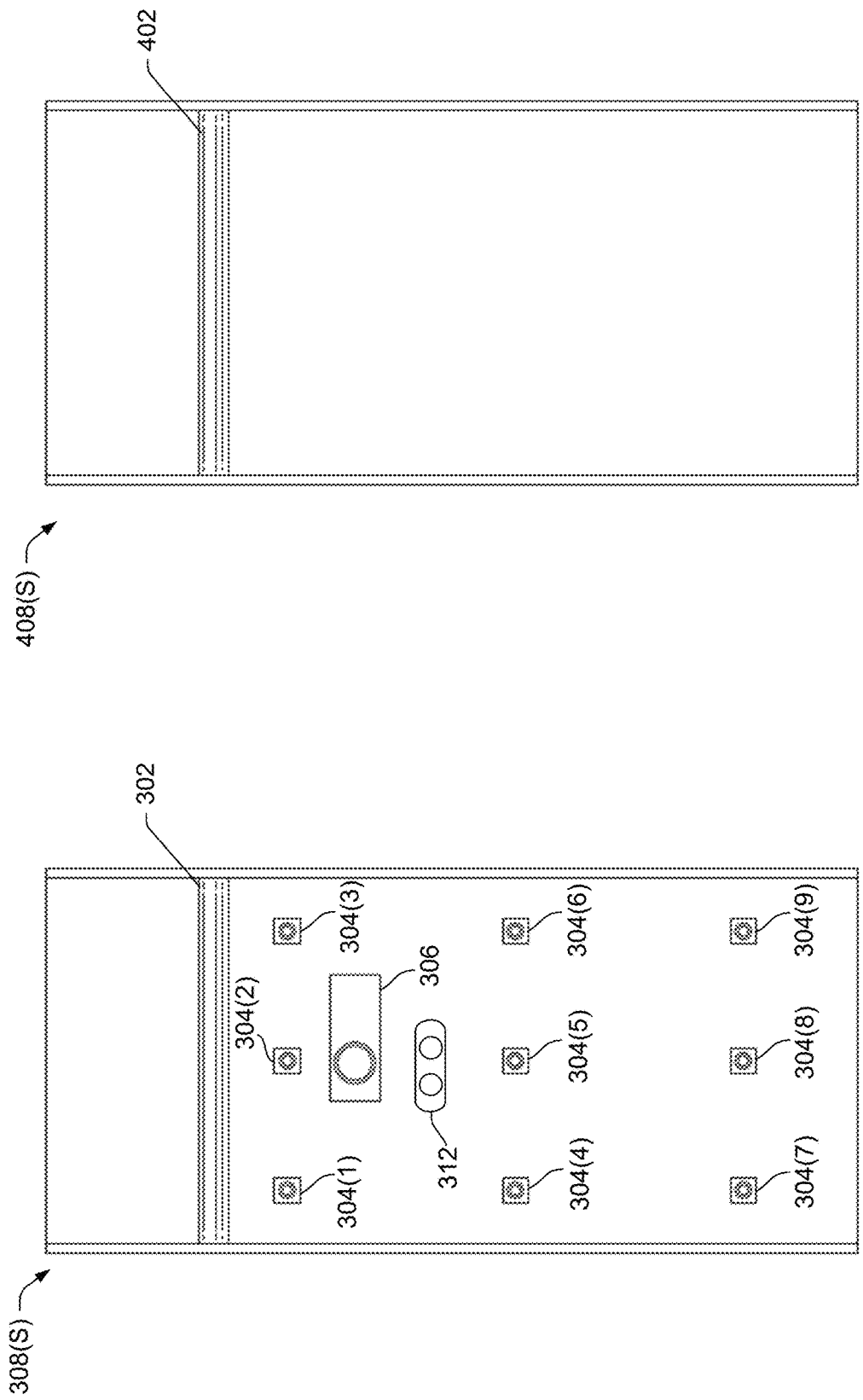

MODULAR IMAGING SYSTEM

BACKGROUND

It is a common practice for operators of retail websites to hire human photographers to take high-quality images of products for use in selling those products online. This is because the operators of such websites generally have relatively strict image quality requirements that must be satisfied. For example, website operators typically require product images to be free from shadows, to have a minimum level of sharpness, brightness, and/or clarity. In order to obtain such high-quality images, a qualified human photographer can move a high-resolution camera around the product, capturing images of the product from various angles while carefully controlling the lighting in the environment.

In recent history, automated imaging systems were developed to automate this human-centric process. These systems have been developed to not only create high-quality two-dimensional (2D) images, but they are often capable of capturing image data that is usable to create three-dimensional (3D) models of an object, all without the need for a human photographer. This image data can be used in various industries and applications, not just for capturing product images for retail websites.

While existing automated imaging systems are functional in regards to their ability to capture image data, these devices can be quite bulky and large in size (e.g., often the size of a vehicle, such as a truck or a bus). The large size of these devices can allow for imaging objects that range in size, but it also means that buildings with ample space to house these large imaging systems must be available. Furthermore, because they are difficult to disassemble, it is also difficult to relocate these imaging systems to other locations, which means that they either have to remain at a fixed location, or they must be transported by freight shipping. This severely limits the use of existing automated imaging systems. The disclosure made herein is presented with respect to these and other considerations.

BRIEF DESCRIPTION OF THE DRAWINGS

This detailed description is described with reference to the accompanying figures. In the figures, the left-most digit(s) of a reference number identifies the figure in which the reference number first appears. The same reference numbers in different figures indicate similar or identical items.

FIG. 3 illustrates a front view of an example side panel that further includes a depth sensor.

FIG. 4 illustrates a front view of an example side panel that represents a lighting panel without cameras.

DETAILED DESCRIPTION

Figure 1:
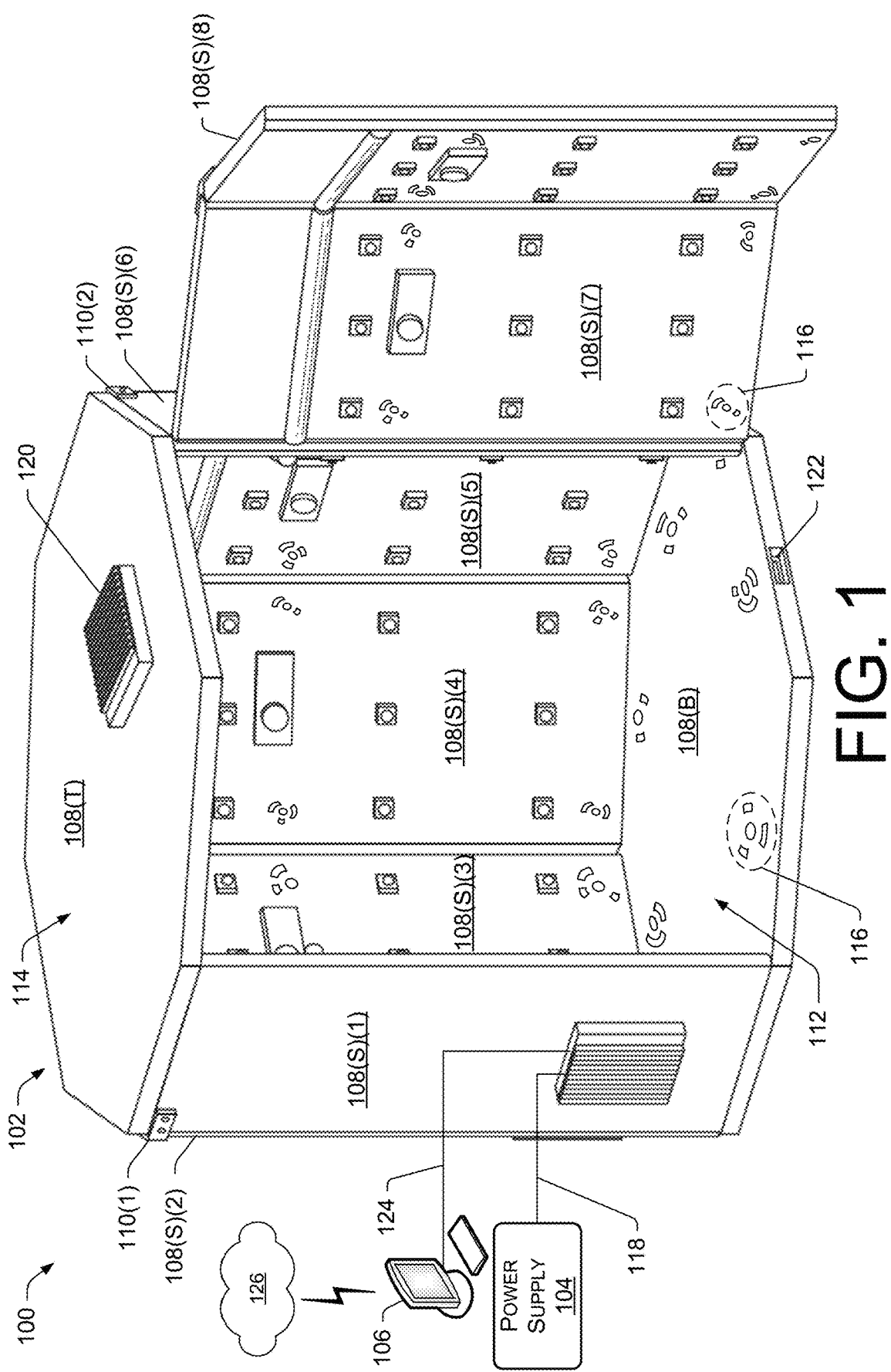
FIG. 1 illustrates an example modular imaging system that includes a modular imaging enclosure, a power supply, and a system computer.

Described herein are systems and methods related to a modular imaging system used for capturing images of an object. The example modular imaging system disclosed herein is constructed with multiple panels coupled together to form a modular imaging enclosure, creating an interior space where an object can be placed for capturing images of the object. In some embodiments, the modular imaging enclosure may include multiple side panels, as well as a top panel and/or a bottom panel in addition to the multiple side panels. One or more of the multiple panels are "imaging panels" to allow for capturing images of an object disposed within the modular imaging enclosure. An "imaging panel," as used herein, is a panel that includes an array of cameras configured to capture images. An imaging panel may include additional components as well, such as one or more light emitting elements and a dedicated panel computer. In some embodiments, a majority, if not all, of the multiple side panels are imaging panels to surround an object within the enclosure so that the object can be imaged from a variety of different angles. In some cases, one or more of the multiple side panels are "lighting panels" that omit cameras, yet include one or more lighting elements to emit light within the enclosure. In addition to the modular imaging enclosure, the modular imaging system may further include a power supply that is configured to supply power to the electronic components of the individual panels during operation. The modular nature of the disclosed imaging system provides several benefits over existing systems.

The modular imaging system disclosed herein is versatile. Due to its modular design, the modular imaging enclosure allows for adapting the size and/or shape of the enclosure by adding or removing panels, as needed, to create a variety of different panel configurations. This allows for capturing images of varying sized and/or shaped objects. For example, a panel configuration with merely a few side panels (e.g., four side panels to create a cuboid shape) may be used to capture images of relatively small objects (e.g., action figures). Meanwhile, a different panel configuration with a greater number of side panels (e.g., eight side panels to create an octagonal prism shape), and/or multiple vertically-stacked levels of side panels, may be used to capture larger and/or taller objects (e.g., a tall floor lamp, a shovel, a ladder, and/or a tall piece of furniture, etc.).

The modular imaging system disclosed herein also has wide ranging imaging capabilities. For instance, by arranging multiple panels with both lighting and cameras in a manner such that an object is surrounded with such lighting and cameras, the modular imaging system is capable of capturing various types of image data (video, two-dimensional (2D) images, three-dimensional (3D) images, etc.) from a variety of vantage points. In some embodiments, the modular imaging system is configured to capture image data that is usable for constructing a 3D model of an object. In these scenarios, individual panels may include a variety of additional sensors (e.g., depth sensors, pattern projectors, etc.), and particular panels may include fiducial markings to help generate a 3D model from multiple captured images. In some embodiments, 2D still images can be extracted, or otherwise generated, from video data, 3D image data, and the like. In some embodiments, multi-image sequences (360-degree spins) can be created from the image data obtained by the disclosed imaging system. In some embodiments, end uses, like augmented reality (AR) and/or virtual reality (VR), can benefit from 3D models that are generated from the image data captured by the disclosed imaging system.

The modular imaging system disclosed herein is also easy to use. For instance, the panels (e.g., the side panels) used to construct the modular imaging enclosure can be coupled together using relatively simple hardware (e.g., brackets and bolts, alignment pins, grooves, etc.) for quick assembly (setup) and/or disassembly (tear down). In this manner, setting up, using, and tearing down the modular imaging enclosure is simple enough for unsophisticated users—no special training (e.g., training in photography, robotics, etc.) is necessary. In many of the examples described herein, the modular imaging system includes no, or very few, moving parts (e.g., fixed, shutter-less cameras, fixed lighting, etc.), which makes setup and use quick and easy.

The modular imaging system disclosed herein is also easy to maintain and/or upgrade. For instance, the modularity of the system simplifies maintenance—simply replace a failed/broken panel with a new one. Any investigation/repairs of an individual panel can then be done off-site. Moreover, if a manufacturer of the modular imaging system were to upgrade the panels by changing the types and/or the placements of the electronic devices on the panel (e.g., to improve and/or change the capabilities of the imaging system), a user can simply swap old panels out for new, upgraded panels to take advantage of the system's improved capabilities. In an illustrative example, if and when 3D modeling software improves to the point where professional-grade 2D still images can be extracted from the 3D model's data, the panels of the disclosed modular imaging enclosure can be optimized (through an upgrade) for capturing 3D image data (as opposed to being specifically designed for capturing high-quality 2D photographs of objects in optimal lighting conditions).

The modular imaging system disclosed herein is also ultra-portable. The size and modularity of the imaging enclosure creates a portable imaging system that is easy to break-down to stack multiple panels in a compact configuration (e.g., stacked like a deck of cards). This compact, collapsed configuration is easily transported to enable mobile imaging scenarios (e.g., users can take the modular imaging system to a remote location where an object(s) is to be imaged, as opposed to bringing the object(s) to the location of the imaging system). These characteristics also allow for "flat pack" shipping in order to pack the modular imaging system in standard boxes and use standard shipping (e.g., UPS, FedEx), instead of large crates and freight shipping.

The modular imaging system disclosed herein is also configured to collect and process image data in a short amount of time (e.g., within a minute), as compared to existing imaging systems that may involve cameras that move along a track and take multiple images over the course of a longer timeframe. An imaging-type panel includes an array of cameras, and this array can include several (e.g., nine) separate cameras, or even more cameras. When these imaging-type panels are used at least for side panels (and possibly a top panel) that are arranged such that a plurality of cameras surround an object, the imaging system can capture a high number of images from various angles in a matter of seconds using "intelligent" imaging capture and lighting sequences. Furthermore, individual panels may include their own, dedicated panel computer to processing of image data from a plurality of cameras on a per-panel basis. The per-panel, processed image data can be received by a system computer that combines the processed image data from multiple panels in a short amount of time. In an illustrative example, verified through experimentation, complex data sets from over 75 cameras can be collected and processed in less than a minute (including the time spend analyzing the image data) using the disclosed systems and techniques.

FIG. 1 illustrates an example modular imaging system 100 (sometimes abbreviated herein to "system" 100). The example modular imaging system 100 includes a modular imaging enclosure 102, a power supply 104, and a system computer 106, among other possible components. The modular imaging enclosure 102 is "modular" in the sense that modules are the basis of its design and/or construction. The modules, in this case, are panels 108, which can be coupled together in different panel configurations to construct the enclosure 102, which is made up of the multiple panels 108 used in its construction.

The multiple panels 108 of the modular imaging enclosure 102 can include multiple side panels 108(S), and, in some cases, a top panel 108(T) and/or a bottom panel 108(B) (collectively "panels 108"). The example enclosure 102 shown in FIG. 1 includes eight side panels, 108(S)(1)-108(S)(8), as well as a top panel 108(T), and a bottom panel 108(B). Together, these panels 108—as assembled in the panel configuration shown in FIG. 1—create the enclosure 102 that is in the shape of an octagonal prism. In this panel configuration, the eight side panels 108(S)(1)-108(S)(8) may be rectangular-shaped (or square-shaped), while the top panel 108(T) and the bottom panel 108(B) may be octagonal-shaped. Other panel configurations are possible, which may create enclosures 102 of different prismatic shapes. For example, four side panels 108(S)—and, in some cases, a square-shaped top panel 108(T) and a square-shaped bottom panel 108(B)—may be coupled together to create an enclosure 102 that is the shape of a cuboid. Some other examples of different panel configurations are described in more detail below with respect to the following figures.

The side panels 108(S) can be coupled together at their respective side edges using any suitable connection mechanism(s). For many of the benefits described herein, this connection mechanism(s) may allow for removably coupling the side panels 108(S) together so that pairs of side panels 108(S) can be attached and detached with relative ease by a user of the system 100. In some cases, hardware tools (e.g., wrenches, drills, etc.) may be used to attach pairs of side panels 108(S) together using a connection mechanism(s). Suitable types of connection mechanisms that can be used to removably attach side panels 108(S) together include, without limitation, brackets and bolts, hinges, clamps, alignment pins and corresponding holes (e.g., press fit for greater stability), latches, hooks, Velcro® (e.g., flaps with strips of hook-and-loop fasteners), grooves (e.g., dovetail grooves), and/or any combination thereof.

One example connection mechanism for removably attaching side panels 108(S) together is shown in FIG. 1 as a bracket (e.g., the bracket 110(1) and the bracket 110(2)). The bracket 110 may be used with corresponding bolts in order to attach a pair of side panels 108(S) together. For example, the bracket 110(1) may be used to couple a first side panel 108(S)(1) to a second side panel 108(S)(2) by inserting bolts through aligned apertures in both the bracket 110(1) and the side panels 108(S)(1)/(2), and then tightening nuts onto the bolts from the opposite side. Similarly, the bracket 110(2) may be used to couple a fifth side panel 108(S)(5) to a sixth side panel 108(S)(6) by inserting bolts through aligned apertures in both the bracket 110(2) and the side panels 108(S)(5)/(6), and then tightening nuts onto the bolts from the opposite side. These example brackets 110(1) and 110(2) are shown in FIG. 1 as being positioned at the corners of the side panels 108(S), but the brackets 110 may be positioned at any suitable location along the respective side edges of the side panels 108(S). As mentioned, the side panels 108(S) may have apertures to receive bolts that are used with the brackets 110. In this configuration, the apertures in the side panels 108(S) may be provided at the corners of the side panels 108(S) (e.g., at the top corners, the bottom corners, or both). In general, a sturdy, rigid, or semi-rigid, connection mechanism (e.g., brackets and corresponding bolts), when used to couple the side panels 180(S) together, may provide for a sturdier enclosure 102 that is less prone misalignment when, for example, the enclosure 102 is accidentally bumped by a user. A sturdier enclosure 102 makes it easier to calibrate electronic components (e.g., the cameras, projectors, etc.). However, it is to be appreciated that non-rigid, flexible connection mechanisms may provide their own benefits, such as allowing a user of the system 100 to determine an optimal shape of the enclosure and/or an optimal orientations of the cameras, projectors, etc., and, due to the flexible connection mechanism, the user can adjust the relative positioning (e.g., angles) between respective pairs of panels until the optimal configuration is achieved. In this scenario, fiducial markings on the panels can be used to help calibrate the electronic components (e.g., cameras) and to determine an optimal configuration of the panels.

It is to be appreciated that the panels 108 and the connection mechanism(s) for coupling panels together may be made in such a way so as to allow for reversing the orientation of the panels by turning the inner faces of the panels to face outward, which results in the outer faces of the panels facing inward. For instance, panels 108 may be configured to be coupled together with the cameras, lighting, projector, etc. facing outward so that the physical environment (e.g., a room) in which the enclosure 102 is disposed can be imaged, instead of imaging an object within the enclosure 102. For example, brackets and corresponding bolts used with apertures in the panels 108 may provide such versatility, allowing a user to couple the panels 108 together in either an inward facing manner or an outward facing manner.

Another example connection mechanism is a hinge. For example, in order for the side panels 108(S)(7) and 108(S)(8) to swing open and closed like a door, one or more hinges may be used to couple the sixth side panel 108(S)(6) to the seventh side panel 108(S)(7). This creates a doorway into an interior space 112 of the modular imaging enclosure 102. The multiple panels 108 that are coupled together to construct the enclosure 102 define this interior space 112. Larger and/or smaller doorways may be created by increasing or decreasing the number of side panels 108(S) that swing open and closed (e.g., a triple-panel door may allow for switching out objects of a relatively large size, while a single or double-panel door may be sufficient for smaller objects). In some embodiments, different connection mechanisms can be used interchangeably with the side panels. For instance, the hinge may be attached in the same way as a bracket so that a user can choose which connection mechanism to use, and allowing the user to place hinges anywhere on the enclosure 102. The panels can also be uniformly manufactured without having to be specially made for a particular type of connection mechanism.

To use the modular imaging system 100, a user may place an object inside the enclosure 102 (e.g., by setting the object down on the bottom panel 108(B) in the center of the bottom panel 108(B). The user may then close the "door" of the enclosure 102, which, in this case, is the pair of side panels 108(S)(7) and 108(S)(8). The object can be any object that is desired to be imaged. For example, the object may be a product that is to be offered for sale on a retail website, and the images data relating to this product may be used to create imagery (e.g., still images, videos, 360 spin imagery, etc.) that is posted on the detail page for the product to allow customers to view the product from many different angles. This is merely one example use case for the modular imaging enclosure, and others are contemplated, as described in detail elsewhere herein.

With the object disposed within the interior space 112 of the enclosure 102, electronic components of the individual panels 108 may operate to obtain data relating to the object, including image data. The electronic components of the side panels 108 will now be discussed with reference to FIGS. 2A-2D, before continuing with the description of FIG. 1.

Figure 2A:
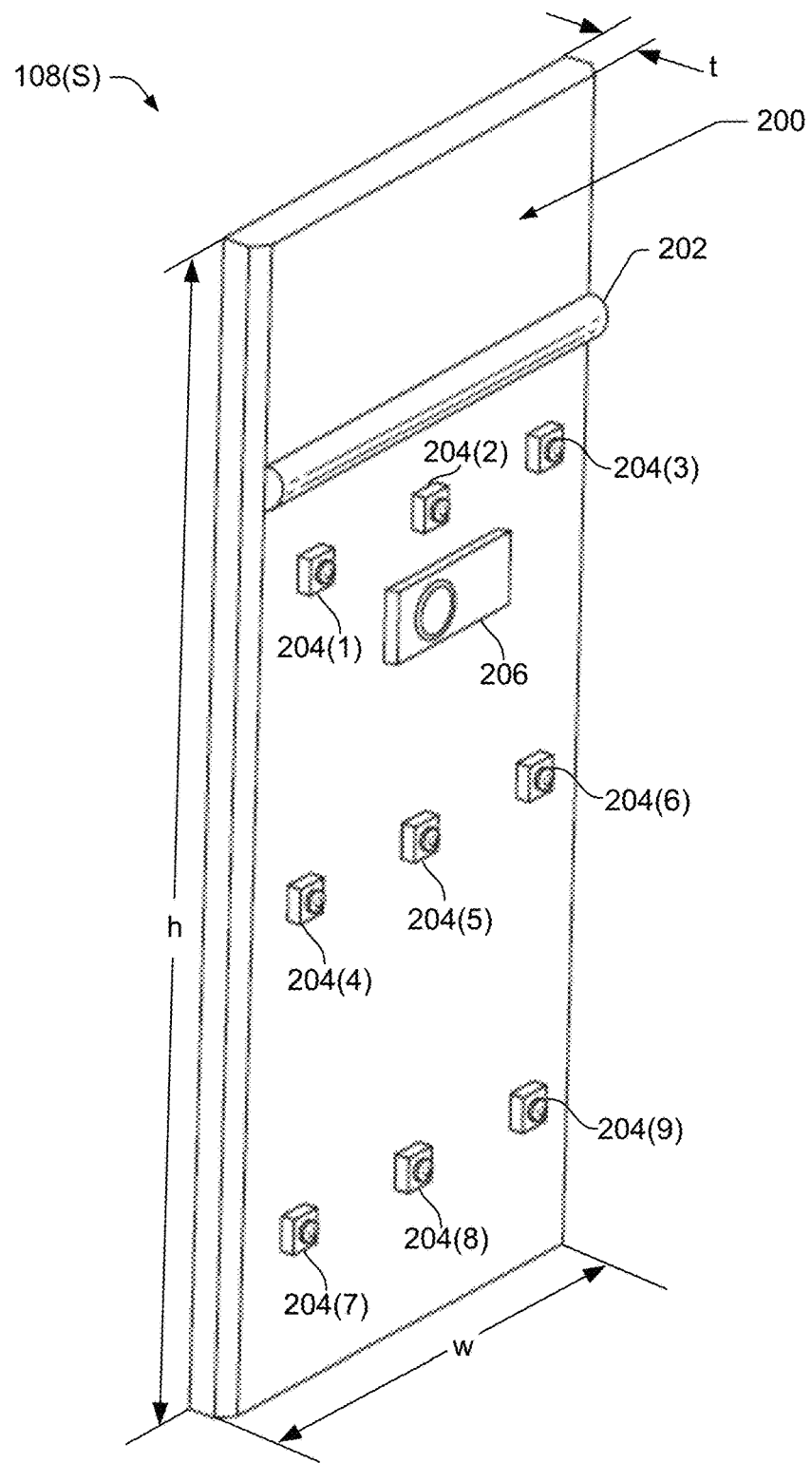
FIG. 2A illustrates a perspective view of an example side panel that is usable to construct a modular imaging enclosure by coupling the side panel to at least additional side panels, the perspective view of FIG. 2A showing an inner face of the side panel.
Figure 2B:
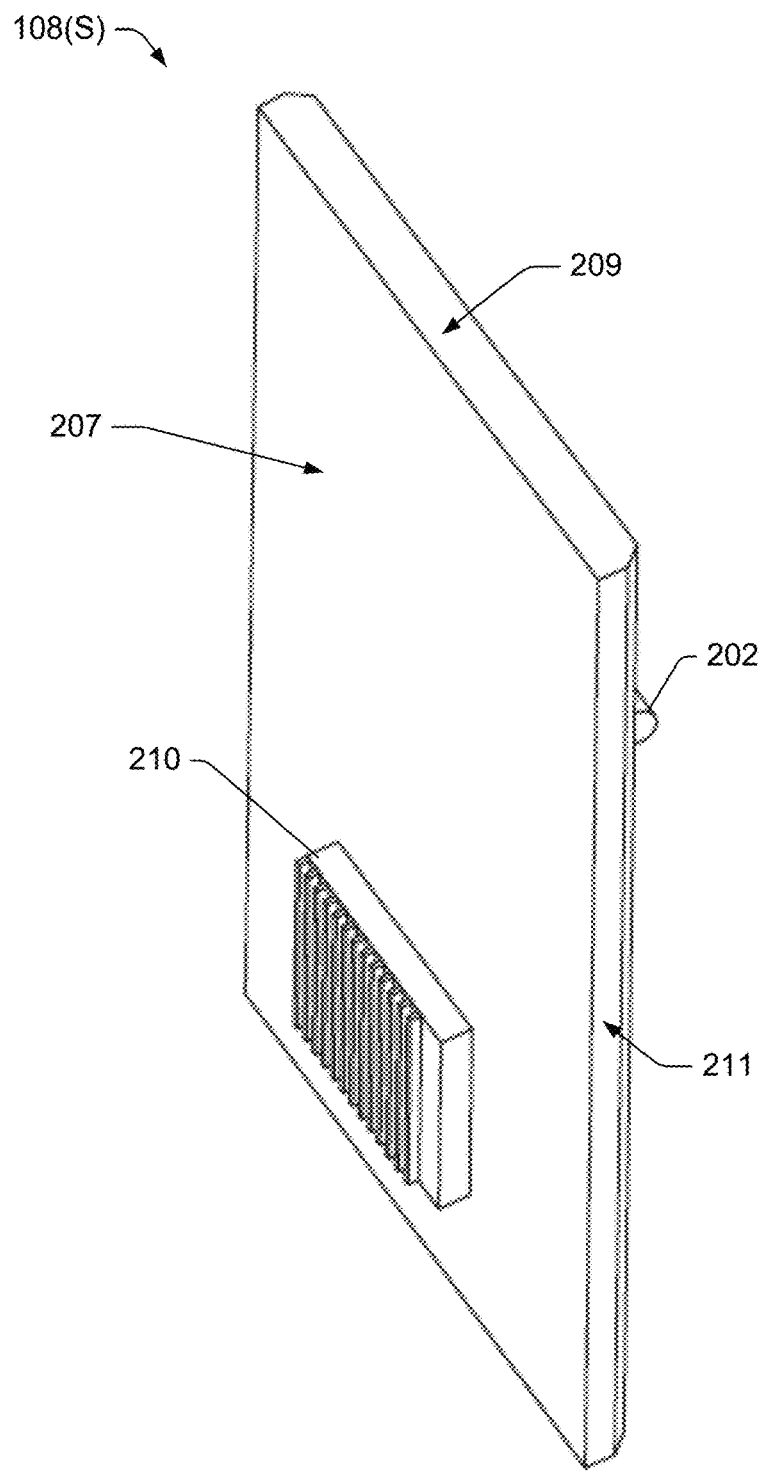
FIG. 2B illustrates another perspective view of the example side panel of FIG. 2A, the perspective view of FIG. 2B showing an outer face of the side panel.
Figure 2C:
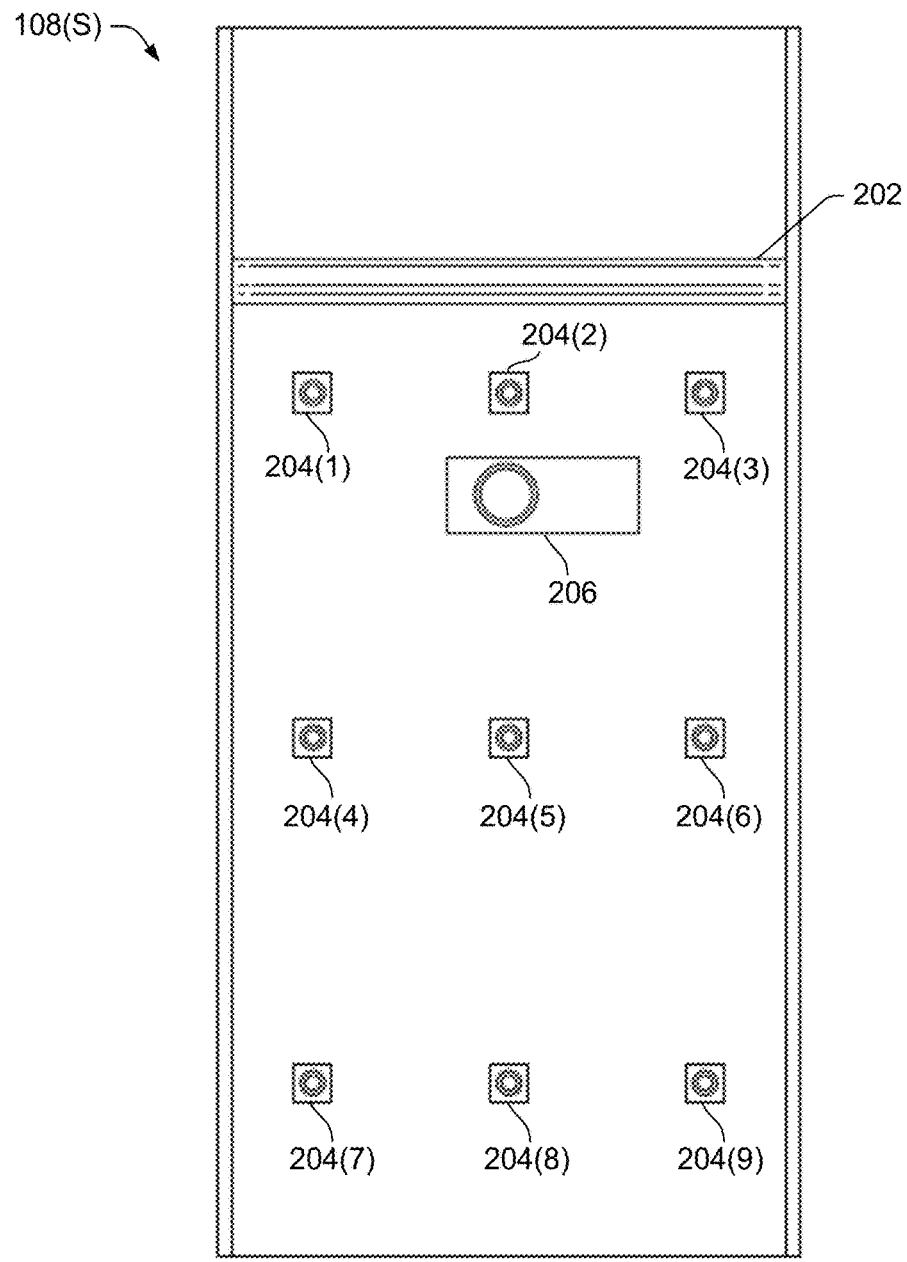
FIG. 2C illustrates a front view of the example side panel of FIG. 2A, the front view of FIG. 2C showing the inner face of the side panel.
Figure 2D:
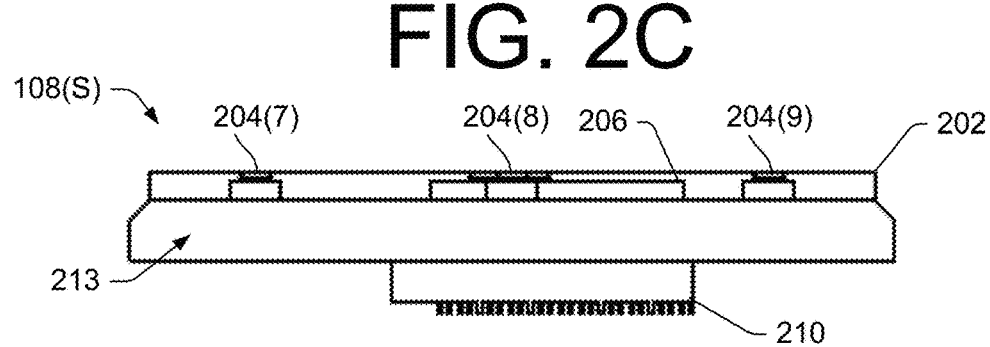
FIG. 2D illustrates a bottom view of the example side panel of FIG. 2A.

FIG. 2A illustrates a perspective view of an example side panel 108(S) that is usable to construct a modular imaging enclosure 102 by coupling the side panel 108(S) to at least additional side panels 108 (and possibly to a top panel 108(T) and/or a bottom panel 108(B)). The perspective view of FIG. 2A shows an inner face 200 of the side panel 108(S). FIG. 2B illustrates another perspective view of the example side panel 108(S) of FIG. 2A, the perspective view of FIG. 2B showing an outer face 207 of the side panel 108(S). FIG. 2C illustrates a front view of the example side panel of FIG. 2A, and FIG. 2D illustrates a bottom view of the example side panel of FIG. 2A.

The side panel 108(S) may be rectangle-shaped (or square-shaped), although other suitable shapes are possible. A rectangle-shaped side panel 108(S) allows for minimizing a gap between a pair of side panels 108(S) when they are coupled together, which may minimize the amount of light that enters or escapes the enclosure 102 during operation, allowing for better control of the lighting conditions within the enclosure 102. This may be useful for capturing professional-grade images of an object disposed within the enclosure 102.

The inner face 200 of the side panel 108(S) is configured to be oriented facing towards the interior space 112 of the enclosure 102. The panels 108 can be made of any suitable material that is rigid or semi-rigid, such as a plastic, a metal, a composite material, or any similar type of material. The panels 108 can be manufactured using any suitable manufacturing technique, including, without limitation, injection molding, extrusion, machining, 3D printing, etc. The inner face 200 can be made of, or coated with, a material that provides particular surface properties, which can vary depending on the use case for the system 100. For example, the inner face 200 may be a particular color, such as white, black, or any other color. The inner face 200 may also be made of, or coated with, a reflective material, a matte material, or any other suitable material that provides desired aesthetics for a background of an image when capturing imagery of an object. The surface properties of the panel may vary depending on the use case.

In some embodiments, individual panels 108 may be configured with interchangeable faceplates that can be secured to the inner face 200, which allows a user to change the surface properties of the inner surface of the panel 108 on demand. These faceplates can include cutouts for the various electronic components of the panel 108 that are mounted to the inner face 200. In an example, a faceplate with black color and a matte finish can be swapped out with a different faceplate having a white color and a reflective finish to provide different aesthetic characteristics in the resulting images.

The dimensions of the side panel 108(S) can vary, depending upon the implementation and the size/shapes of objects that are to be placed within the enclosure 102. For many of the benefits described herein, the individual side panel 108(S) may be of a size that is suitable for a human to carry/move around without much difficulty. This is because the modular imaging enclosure 102 is designed such that a single user can easily setup, use, and tear down the enclosure 102, without requiring assistance from others. In some embodiments, the height, h, of the side panel 108(S) is within a range of 2 to 5 feet. In some embodiments, the width, w, of the side panel 108(S) is within a range of 1 to 3 feet. In some embodiments, the thickness, t, of the side panel 108(S) is within a range of 1 to 3 inches. These dimension ranges make for a side panel 108(S) that can be easily picked up and moved around by an average human user. In some embodiments, the resulting size of an enclosure 102 made up of multiple panels may be a size that can be easily set down on a floor of a standard size room, or, in some cases, set upon a table. The size of the modular imaging enclosure 102, and the ease with which it can be setup and torn down, makes the enclosure 102 easy to transport for shipping and/or bringing the imaging system to a destination location (e.g., a restaurant, grocery store, etc.) where objects, like food products, can be imaged.

FIG. 2B also shows a top edge 209 of the side panel 108(S) and a side edge 211 of the side panel 211. Similarly, FIG. 2D shows a bottom edge 213 of the side panel 108(S). These edges are referenced herein when describing different panel arrangements.

As shown in FIGS. 2A-2D, the side panel 108(S) may include various electronic components, such as, without limitation, one or more light emitting elements 202, an array of cameras 204(1)-(9), a projector 206, and a panel computer 210, among other possible electronic components. The side panel 108(S) shown in FIGS. 2A-2D is a type of panel referred to herein as an "imaging panel" due to its ability to capture images of an object using the embedded array of cameras 204(1)-(9). An imaging panel is one example type of side panel 108(S) that can be utilized to construct a modular imaging enclosure 102. Other types of side panels 108(S) (described below) can be used in combination with imaging panels to construct the enclosure 102. In some embodiments, all of the side panels 108(S) of an enclosure 102 are imaging panels. In other embodiments, some, but not all, of the side panels 108(S) of an enclosure 102 are imaging panels.

The light emitting element(s) 202 of the side panel 108(S) may be mounted on the inner face 200 of the side panel 108(S) and is/are configured to emit light. When the side panel 108(S) is one of multiple side panels 108(S) that are coupled together to form a modular imaging enclosure 102, like the enclosure 102 of FIG. 1, the light emitting element(s) 202 of the side panel 108(S) is/are configured to emit light within the interior space 112 of the enclosure 102 because the inner face 200 is to be oriented facing towards the interior space 112 of the enclosure 102, as shown by way of example in FIG. 1. In some embodiments, the light emitting element(s) 202 is/are mounted on the inner face 200 of the side panel 108(S) above the array of cameras 204(1)-(9). In some embodiments, the light emitting element(s) 202 is/are mounted on the inner face 200 within a top half of the inner face 200 of the side panel 108(S). In some embodiments, the light emitting element(s) 202 include a strip of light emitting diodes (LEDs), the strip running (or extending) horizontally along the inner face 200 of the side panel 108(S). The strip of LEDs may be mounted to an aluminum backing that is itself mounted on the inner face 200 of the side panel 108(S). Electrical connections (e.g., including pins, wiring, flex cables, etc.) may connect the light emitting element(s) 202 to a printed circuit board (PCB) or a similar component embedded within the side panel 108(S). Such a PCB may electrically couple the light emitting element(s) 202 to a light controller(s) configured to control the operation of the light emitting element(s) 202. In some embodiments, the side panel 108(S) may further include a diffusing material disposed over the strip of LEDs to diffuse the light. Thus, the light emitting element(s) 202 seen in FIG. 2 may represent a strip of LEDs covered by a diffusing material. The diffusing material may help to spread the light to create relatively uniform lighting conditions within the interior space 112 of the enclosure 102. In some embodiments, additional light emitting elements, in addition to the light emitting element(s) 202 shown in FIG. 2, may be mounted on the inner face 200 of the side panel 108(S) to provide the capability of outputting more light. For example, an additional strip(s) of LEDs can be mounted above the light emitting element(s) 202 to increase the light output capabilities of the panel 108. This may be beneficial in scenarios where a relatively large enclosure 102 is constructed of a high number of panels 108, creating a larger interior space 112 where a greater amount of light output may be needed to obtain desired images. When multiple light emitting elements 202 are included on a panel 108 (e.g., multiple strips of LEDs), the light emitting elements 202 may be controllable on an individual basis to vary the amount of light output, which provides for fine-tuned control of the amount of light output by a single panel 108.

The array of cameras 204(1)-(9) may be mounted on the inner face 200 of the side panel 108(S) and may be configured to capture images. When the side panel 108(S) is one of multiple side panels 108(S) that are coupled together to form a modular imaging enclosure 102, like the enclosure 102 of FIG. 1, the array of cameras 204(1)-(9) on the side panel 108(S) are configured to capture images of an object disposed within the interior space 112 of the enclosure 102 because the inner face 200 is to be oriented facing towards the interior space 112 of the enclosure 102, as shown by way of example in FIG. 1. The array of cameras 204(1)-(9) may include any suitable number of cameras, including as few as two cameras 204. A pair of cameras 204 may be spaced apart from each other vertically, horizontally, or diagonally, yet remain coplanar on the inner face 200. For example, the camera 204(4) is coplanar with the camera 204(1), and is spaced from the camera 204(1) in a vertical direction relative to the camera 204(1). The camera 204(2) is also coplanar with the camera 204(1), and is spaced from the camera 204(1) in a horizontal direction relative to the camera 204(1). The camera 204(5) is also coplanar with the camera 204(1), and is spaced from the camera 204(1) in a diagonal direction relative to the camera 204(1). In FIG. 1 and FIGS. 2A-2D, the number of cameras 204 included in the array is nine, which is a suitable number of cameras 204 given the contemplated dimensions of each camera (e.g., each camera 204 occupying approximately one square inch of area/space on the inner face 200) and given the contemplated dimensions of the side panel 108(S), as described above. The array of nine cameras 204(1)-(9) includes a first camera 204(1), a second camera 204(2), a third camera 204(3), a fourth camera 204(4), a fifth camera 204(5), a sixth camera 204(6), a seventh camera 204(7), an eighth camera 204(8), and a ninth camera 204(9), each configured to capture one or more respective images during operation of the system 100. These nine cameras are shown as being arranged in a camera arrangement of three rows and three columns, each row having three cameras, and each column having three cameras. Thus, the cameras 204 in the array can be evenly spaced vertically, and evenly spaced horizontally, as shown in FIG. 2C, creating a matrix arrangement of cameras 204. In this example, the matrix arrangement provides three elevations (or levels) of cameras 204. Although an example of a nine-camera array 204 is shown in FIGS. 1 and 2A-2D, any suitable number of cameras 204 can be used for the array 204.

Electrical connections (e.g., including pins, wiring, flex cables, etc.) may connect the cameras 204 to a PCB or a similar component embedded within the side panel 108(S). Such a PCB may electrically couple the cameras 204 to a camera controller(s) configured to control the operation of the cameras 204. For instance, a camera controller(s) may control the cameras 204 to capture images in coordination with the light emitting element(s) 202 and/or in coordination with the projector 206, and/or in a pre-programmed sequence. The camera controller(s) may further control settings or adjustable mechanisms of the cameras 204, such as by changing the field of view (FOV) of the individual cameras 204. Accordingly, the cameras 204 may be fixed at a particular location on the side panel 108(S), while their field of views (FOV) may be adjustable, whether the adjustment is done manually and/or electronically (e.g., programmatically via the camera controller(s)). Having fixed cameras, rather than movable cameras (e.g., translatable on tracks or conveyer belts, rotatable on pivots, etc.) helps lower manufacturing cost, makes shipping the side panel 108(S) easier because the panel 108(S) is more durable (no breakable moving parts), and helps with camera calibration (e.g., calibrate once, without having to recalibrate). The FOV of each camera 204 in the array may be different and may depend on the size (e.g., the height) of the object that is to be imaged. For small objects, each camera 204 may be angled downward to have its FOV centered on the center of the bottom panel 108(B) where the object is to be placed. For taller objects, at least some of the cameras 204 may have a FOV that is substantially perpendicular to the inner face 200 of the side panel 108(S), or even angled upward. In some cases, a camera's FOV may be angled rightward or leftward from perpendicular to the panel 108(S), depending on where the camera 204 is positioned on the inner face 200 of the side panel 108(S). Any suitable type of camera can be used for the cameras 204 in the array. For example, the individual cameras 204 may be high resolution (e.g., 12 megapixels (MP), 16 MP, etc.) red-green-blue (RGB) cameras, with any suitable type of lens (e.g., 10 millimeter (mm), 16 mm, etc.). The cameras 204 may be shutterless, in some embodiments.

The projector 206 (e.g., a RGB projector) may be mounted on the inner face 200 of the side panel 108(S) and may be configured to project a pattern on the object disposed within the interior space 112 of the enclosure 102. Use of the projector 206 (sometimes referred to herein as a "pattern projector" 206) may allow for providing data to 3D modeling software executed by the system computer 106, or by another computer, to build a 3D model of an object that is imaged within the enclosure 102. In some cases, an imaging panel may omit a projector 206, such as when the user is not interested in building a 3D model of the object. The pattern projected by the projector 206 may be any suitable pattern, such as a black and white camouflage pattern. Electrical connections (e.g., including pins, wiring, flex cables, etc.) may connect the projector 206 to a PCB or a similar component embedded within the side panel 108(S). Such a PCB may electrically couple the projector 206 to a projector controller(s) configured to control the operation of the projector 206. For instance, a projector controller(s) may control the projector 206 to project a pattern in coordination with the light emitting element(s) 202 and/or in coordination with the cameras 204. During operation of the system 100, the light emitting element(s) 202 may be turned off while the projector 206 projects a pattern onto an object disposed within the interior space 112 of the enclosure 102, and while the array of cameras 204 capture images with the pattern projected onto the object. 3D modeling software can then use the pattern-projected images (or image data associated therewith) to aid in the process of building the geometry of a 3D model of the object. Non-pattern-projected images can also be captured without the pattern projected on the object and with the light emitting element(s) 202 turned on. These non-pattern-projected images can be used for surface texturing on the 3D model built, at least in part, from the pattern-projected images.

The panel computer 210 is shown as being mounted on the outer face 210 of the side panel 108(S). This positioning may be chosen because the panel computer 210 does not need to be facing inward toward the interior space 112 during operation. The panel computer 210 may be configured to at least process image data associated with images captured by the cameras 204 of the side panel 108(S). The panel computer 210 may be further configured to send (or otherwise provide) control signals to various controllers that control the operation of controllable electronic components of the side panel 108(S). For example, the panel computer 210 may send control signals to the aforementioned light controller(s), the camera controller(s), and/or the projector controller(s) to control the operation and other adjustable settings of at least those corresponding electronic components. The panel computer 210 may be configured to send control signals to, and process additional data received from, additional types of electronic components that may be included on the side panel(s) 108(S), as described herein. The panel computer 210 may be further configured to send processed (and unprocessed (or raw)) data (e.g., image data) to the system computer 106, and the system computer 106 may store, process, and/or transmit the data it receives from the panel computers 210 of multiple side panels 108(S), such as by combining processed data from the side panels 108(S) to create a 3D model of an object disposed within the enclosure 102.

The panel computer 210 may represent any suitable type of computing device with at least processing resources (e.g., a central processing unit (CPU)) and memory. Individual side panels 108(S) having their own dedicated panel computer 210 helps to distribute some of the workload within the system 100 for improving efficiency of processing data. The primary purpose of the panel computer 210 may be to get the raw image data from each camera 204 of the array of cameras 204 on the side panel 108(S), and to process that data, such as by performing white balance processing, de-warping, camera calibration, computer vision (e.g., identifying fiducial markings, bounding boxes, objects, etc.). In a scenario as shown in FIG. 1, there are 72 cameras in total across the multiple side panels 108(S)(1)-(8). Without the dedicated panel computers 210, the system computer 106 may be left to process all of the raw image data from all 72 cameras, which may overload the processing resources of the system computer 106. The inclusion of dedicated panel computers 210 on the imaging panels allows for increasing efficiency and throughput of the data through intelligent data processing algorithms. The system computer 106 may be tasked with offloading the data from the panel computers 210 and combining that data for downstream processing tasks (e.g., building 3D models, 360 degree spin animations, etc.). The panel computers 210 may be configured to compress the data before transferring the data to the system computer 106. In some embodiments, an individual panel 108, such as an imaging-type panel described herein, may further include a dedicated networking component (e.g., a router) to coordinate, or otherwise manage, the data traffic to/from the various electronic components (e.g., cameras 204, projector(s) 206, etc.) of the panel 108.

FIG. 3 illustrates a front view of an example side panel 308(S) that further includes a depth sensor 312. That is, the side panel 308(S) may include, without limitation, a light emitting element(s) 302 (which may be similar to the light emitting element(s) 202 described herein), an array of cameras 304 (which may be similar to the array of cameras 204 described herein), a projector 306 (which may be similar to the projector 206 described herein), and one or more depth sensors 312. The depth sensor(s) 312 may be mounted on the inner face of the side panel 308(S) and may be configured to capture depth data, which may be processed by the panel computer 210 during operation of the system 100. The depth sensor(s) 312 can be any suitable type of depth sensor, such as a camera-based depth sensor using a technique to capture image data with depth data (e.g., time-of-flight (ToF)— including infrared (IR)-based ToF, structured light imaging, stereo imaging, etc.). The depth sensor(s) 312 may be used in both 2D and 3D imaging use cases. For instance, in a 2D imaging use case, the depth sensor(s) 312 may aid in determining a scale of the object being imaged within the enclosure 102. This eliminates the need for using a "prop" of some known size that would otherwise be placed next to the object.

FIG. 4 illustrates a front view of an example side panel 408(S) that represents a lighting panel without cameras. As mentioned, other types of side panels besides imaging panels can be used in combination with imaging panels to construct the enclosure 102. The side panel 408(S) shown in FIG. 4 is an example of one of these other types of panels. Notably the side panel 408(S) omits cameras, yet it includes a light emitting element(s) 408 (which may be similar to the light emitting element(s) 202 described herein). In other embodiments, some, but not all, of the side panels 108(S) of an enclosure 102 are imaging panels. In this scenario, the side panels may alternate between imaging panels and lighting panels (e.g., the enclosure 102 may be constructed of an imaging panel 108(S)/308(S) coupled to an adjacent lighting panel 408(S), which, in turn, is coupled to an adjacent imaging panel 108(S)/308(S), and so on and so forth). Other patterns or arrangements of side panels are possible, such as imaging panel, imaging panel, lighting panel, imaging panel, imaging panel, side panel, and so on. Use of a lighting panel may save cost and/or resource consumption in scenarios where remaining imaging panels are sufficient to image an object from various angles. A lighting panel may omit other components as well, such as a panel computer 210. In this scenario, in order to control the light emitting element(s) 402 of the lighting panel 408(S), a data connector between an adjacent imaging panel 108(S) may allow the panel computer 210 on the imaging panel 108(S) to provide lighting control signals for controlling the operation of the light emitting element(s) 402. This may "round-robin" across the enclosure 102 such that a given imaging panel 108(S) may be tasked with controlling the electronic components on the imaging panel 108(S) and also controlling one or more electronic components on an adjacent lighting panel 408(S).

Returning with reference to FIG. 1, the panel configuration that includes eight side panels 108(S) coupled together allows for constructing a modular imaging enclosure 102 that is optimized in size for capturing images at multiple different angles relative to an object disposed within the interior space 112 of the enclosure. For example, if all of the side panels 108(S) are imaging panels, as shown in FIG. 1, images can be captured at every 15 degrees of rotation around the object.

Figure 5:
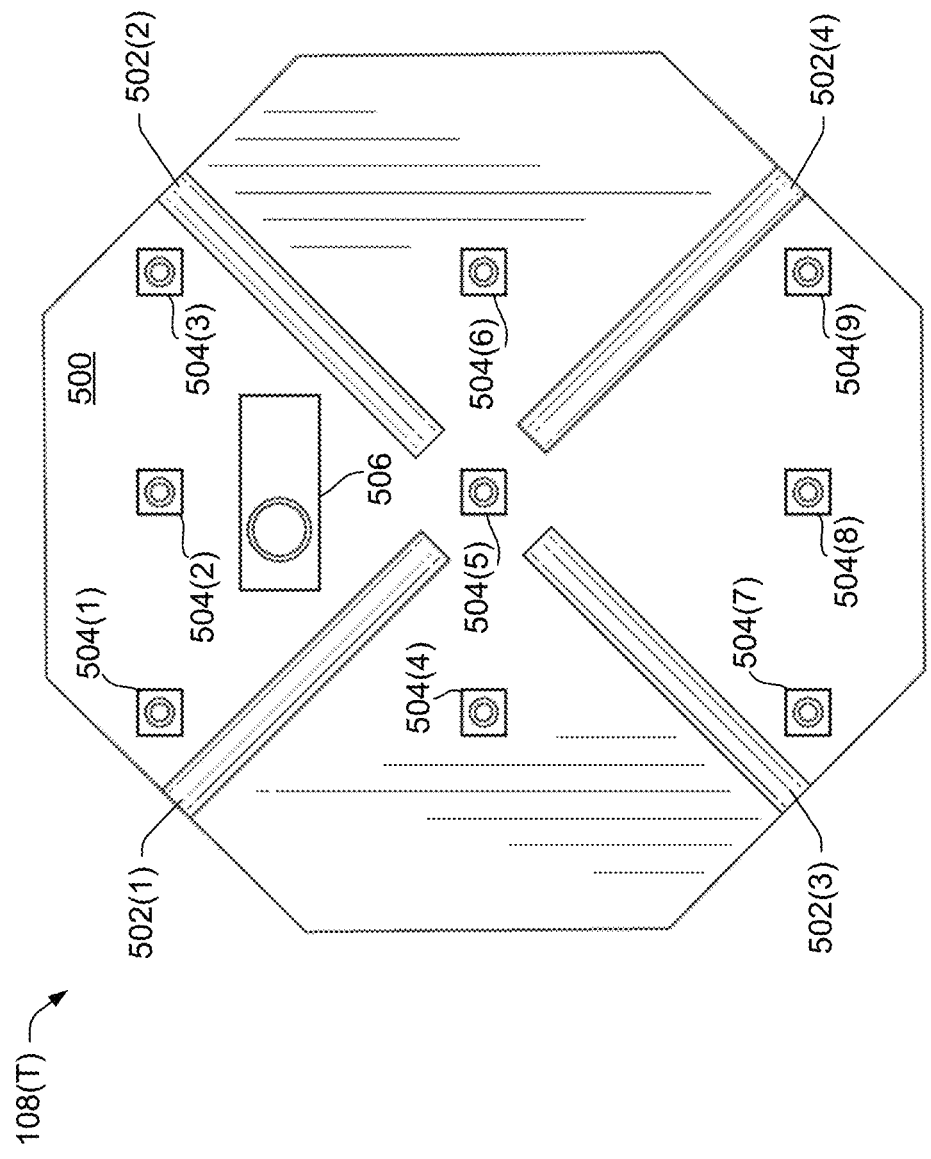
FIG. 5 illustrates a bottom view of an example top panel that is usable to construct a modular imaging enclosure by disposing the top panel atop multiple side panels, the bottom view of FIG. 5 showing an inner face of the top panel.

The panel configuration shown in FIG. 1 also includes a top panel 108(T) disposed on respective top edges 209 of the multiple side panels 108(S). The top panel 108(T) may be an imaging-type panel with corresponding electronic components. FIG. 5 illustrates a bottom view of the example top panel 108(T) shown in FIG. 1, the bottom view of FIG. 5 showing the inner face 500 of the top panel 108(T). The top panel 108(T) may include, without limitation, one or more light emitting elements 502(1)-(4) (which may be similar to the light emitting element(s) 202 described herein), one or more cameras 504(1)-(9) (which may be similar to the array of cameras 204 described herein), a projector(s) 306 (which may be similar to the projector 206 described herein). These components may be mounted to the inner face 500 of the top panel 108(T). As such, the camera(s) 504 may also be configured to capture one or more additional images of the object disposed within the interior space 112 of the modular imaging enclosure 102. In some embodiments, the top panel 108(T) may omit cameras. In some embodiments, the light emitting elements 502(1)-(4) may be mounted on the inner face 500 of the top panel 108(T) in a crisscross arrangement, as shown in FIG. 5. For example, each light emitting element 502 may be a strip of LEDs that runs along a direction from a periphery of the top panel 108(T) towards a center of the top panel 108(T). With an octagonal-shaped top panel 108(T), the light emitting elements 502(1)-(4) may be diagonally oriented on the inner face 500. These are merely example ways in which the light emitting elements 502 can be mounted on the inner face 500 of the top panel 108(T), however, and other arrangements are contemplated, such as strips of LEDs at, or near, a periphery of the top panel 108(T) that run along the side edges of the top panel 108(T). The top panel 108(T) may further include a panel computer 120 mounted on an outer face 114 of the top panel 108(T), as shown in FIG. 1. Although the top panel 108(T) is shown as have an octagon shape, the top panel 108(T) may alternatively be square-shaped, rectangle-shaped, or any other suitable shape, depending on the panel configuration employed to construct the enclosure 102. The top panel 108(T) may or may not be affixed or otherwise coupled to the side panels 108(S) because gravity may allow for setting the top panel 108(T) atop the side panels 108(S) without otherwise coupling the top panel 108(T) to the side panels 108(S). However, it is contemplated that the top panel 108(T) can be coupled to one or more of the side panels 108(S) using any suitable connection mechanism(s), as described herein, such as the bracket 110 and bolt connection mechanism.

The panel configuration shown in FIG. 1 also includes a bottom panel 108(B) disposed opposite the top panel 108 (T). Similar to the top panel 108(T), the bottom panel 108(B) may or may not be affixed or otherwise coupled to the side panels 108(S) because gravity may allow for setting the side panels 108(S) atop the bottom panel 108(B) without otherwise coupling the bottom panel 108(B) to the side panels 108(S). However, it is contemplated that the bottom panel 108(B) can be coupled to one or more of the side panels 108(S) using any suitable connection mechanism(s), as described herein, such as the bracket 110 and bolt connection mechanism. The bottom panel 108(B) may include one or more additional light emitting elements (not shown) configured to emit light, and a diffusing material disposed over the additional light emitting element(s) to diffuse the light emitted from the additional light emitting element(s). Because the diffusing material occludes the additional light emitting element(s), the additional light emitting element(s) of the bottom panel 108(B) are not visible in FIG. 1. The additional light emitting element(s) of the bottom panel 108(B) may be similar to the light emitting element(s) 202 described herein, and may aid in producing an aesthetically pleasing image (e.g., by minimizing shadows, etc.). In some embodiments, the bottom panel 108(B) may omit light emitting elements. In some embodiments, the bottom panel 108(B) may include a turntable (e.g., a rotatable platen) that allows for rotating an object within the enclosure 102, which may allow for reducing the number of imaging panels that are used (e.g., reducing to a single imaging panel) because the object can be rotated to image the object from multiple angles. However, a sufficient number of imaging panels to avoid the use of a turntable on the bottom panel 108(B) may allow for the elimination of moving parts that are susceptible to damage or failure in transport. In addition, it is to be appreciated that, in at least some scenarios, an object may be imaged using a single imaging panel by moving the imaging panel around the object and taking images in sequence as the panel is moved around the object. This movement may be done manually, or using a circular track that mechanically moves the panel around the object without human intervention.

FIG. 1 also shows that the bottom panel 108(B) may include one or more fiducial markings 116 on its inner face, and that individual side panels 108(S) may include one or more additional fiducial markings 116 on their inner faces 200. These fiducial markings 116 may be identified by the panel computers 210 of the side panels 108(S) that have panel computers 210 while processing image data. That is, the cameras 204 of the side panels 108(S) may capture images that include the fiducial marking(s) 116 on the bottom panel 108(B) and or other side panels 108(S) in the FOV of the cameras 204, and the when processing the image data associated with those captured images, the panel computers 210 may identify fiducial markings 116 depicted in those images, which may be used by 3D modeling software to aid in the creation of a 3D model of an imaged object (e.g., by determining where each camera 204 is positioned, and/or how each camera 204 is oriented, etc.). The fiducial markings 116 can, additionally or alternatively, be used for camera calibration. For these purposes, each fiducial marking 116 may be unique in its pattern so that it can be uniquely identified by software used for 3D modeling.

In operation, the power supply 104 may supply power to the various electronic components of the panels 108, such as the light emitting elements 202, the cameras 204, the projectors 206, the panel computers 210, and/or any of the other electronic components described herein. The power supply 104 can be implemented in any suitable manner, such as a power box that is plugged into a wall outlet supplying alternating current (AC) power, a battery power supply, a generator, a solar panel(s), or any other suitable type of power supply 104. The power from the power supply 104 can be delivered at any suitable voltage (e.g., 24 Volts (V), 12V, etc.) and may be delivered to the electronic components of the panels 108 via a power connection 118, which may represent a wired or wireless connection. For example, a power cable may connect the power supply 104 to at least one panel computer 210 of a side panel 108(S) and/or to the panel computer 120 of the top panel 108(T). In some embodiments, panel computers 210 may have their own power supply, such as battery, solar, etc., which may be used as an alternative to the power supply 104 and/or as a backup power supply for redundancy in case the power supply 104 is unavailable or there is a power outage. This offers an even more mobile capability to the system where an external power source may be unavailable.

In some embodiments, there may be a power connection 118 (e.g., a power cable) from the power supply 104 to each panel 108 (e.g., via a power connector provided on the outer face 207 (e.g., on the panel computer 210/120)) of the panel 108. FIG. 1 also shows how the bottom panel 108(B) may include a port 122 on a side edge of the bottom panel 108(B). This port 122 may allow for connecting power and/or data cables to the bottom panel 108(B). Instead of a direct connection from the power supply 104 to each panel 108, however, at least some of the panels 108 that make up the enclosure 108 may be daisy-chained via daisy-chained power connections so that power is supplied from panel-to-panel in a daisy-chained manner. For example, the power supply 104 may be connected to the first side panel 108(S)(1) via a power connection 118 (e.g., a power cable), and the power may be supplied to electronic components of other remaining side panels 108(S) (and/or the top panel 108(T) and/or bottom panel 108(B)) via daisy-chained power connections between the panels 108.

Individual panels 108 may, in addition to power connectors, include data connectors (or interfaces) (e.g., on the panel computer 210/120). Accordingly, a data connection 124 is shown providing a data communications interface between the system computer 106 and the multiple panels 108 that make up the enclosure 102. This data connection 124 may represent a wired or wireless data connection. For example, the system computer 106 may be connected to individual panels 108 via a data cable (e.g., ethernet, universal serial bus (USB), etc.), and/or panels 108 may be equipped with wireless radio chips to transfer/receive data wirelessly to/from the system computer 106 via the data connection 124. Data and/or power may be transferred from one panel to another, directly, rather than receiving power and/or exchanging data directly from/with the system computer 106.

The system computer 106 may be configured to receive processed data (e.g., processed image data from individual panel computers 210 over respective data connections 124 between the panel computers 210 and the system computer 106. The system computer 106 may be configured to combine processed image data, for instance, to create a 3D model of an object. Furthermore, the system computer 106 may transmit/receive data to/from a remote computing system over a computer network 126. The network 126 is representative of any type of public or private network, such as a wide-area network (e.g., the Internet), which extends beyond the environment of the system 100. Thus, the network 126 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The modular imaging system 100 described herein may enable various use cases and applications. For example, the system 100 can be used to obtain high-quality 2D images by controlling the lighting and the imaging sequence to capture desired images. 3D use cases, where image aesthetics are perhaps less of a concern, are also enabled by the system 100. For example, as mentioned, image data can be obtained by operating the system 100, and this image data can be used to generate 3D models of objects disposed within the enclosure 102. This 3D model can be used for many different purposes, such as to extract 2D images (e.g., for use on retail sites), augmented reality (AR)—allowing customers to view computer-generated 3D models of imaged objects on a client device (e.g., a smart phone), virtual reality (VR)—allowing game developers to quickly and efficiently generate virtual objects for use in video games, robotics—allowing for testing of robotic arm manipulation of objects using high-quality 3D models of the objects to ensure that robotic graspers work properly with the object, shipping logistics—allowing for analyses of the best way to pack delivery trucks using 3D models of packaging, drone delivery—using 3D models of objects in a virtual scene representing a back yard where packages are to be delivered for object avoidance analysis, editorial imagery—envisioning how a piece of furniture would look in this particular lighting next to a window using 3D models of the furniture.

Figure 6A:
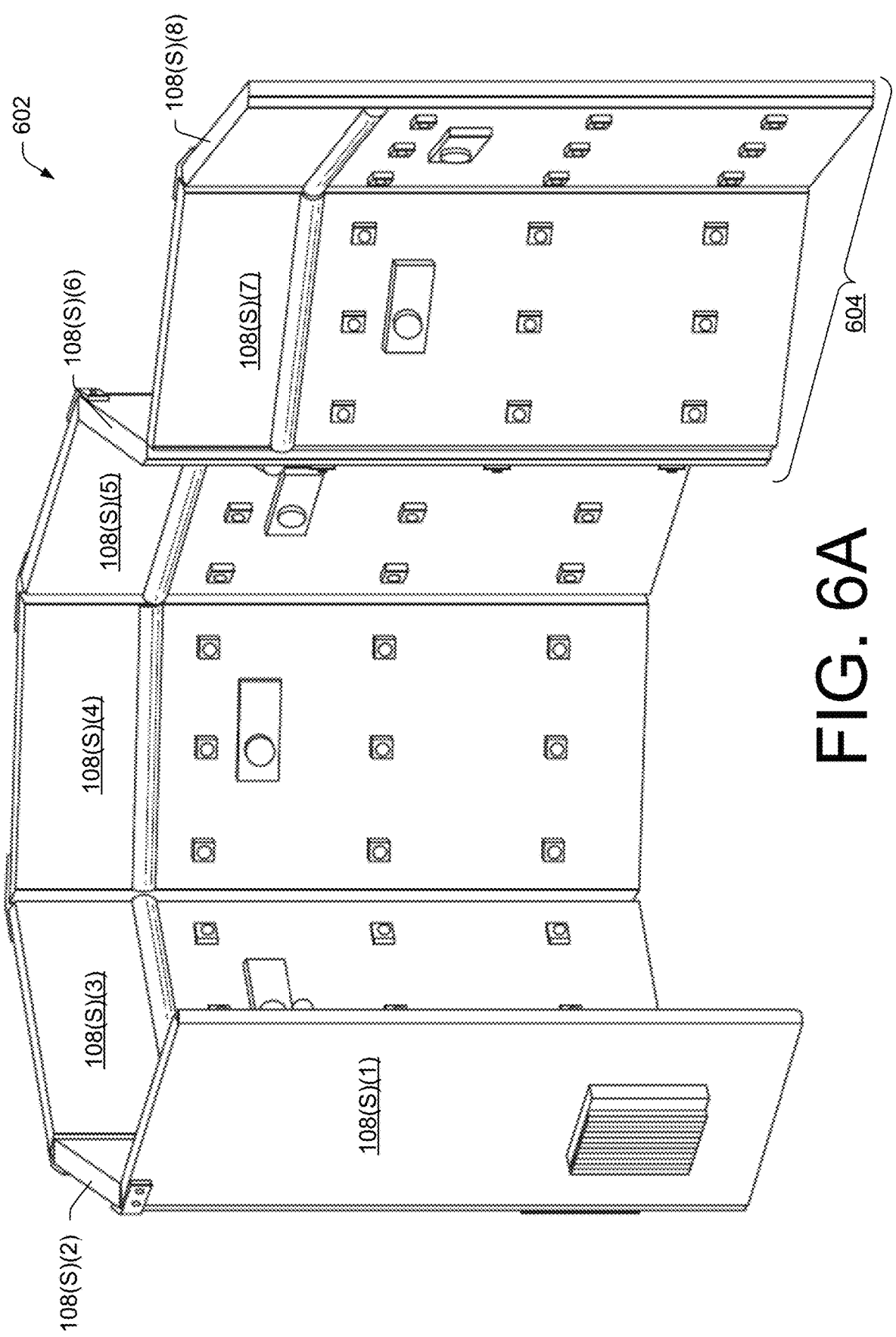
FIG. 6A illustrates a perspective view of an example modular imaging enclosure including eight side panels, FIG. 6A showing a door that provides access to an interior space of the modular imaging enclosure in an opened state.

FIG. 6A illustrates a perspective view of an example modular imaging enclosure 602 including eight side panels 108(S), FIG. 6A showing a door 604 that provides access to an interior space of the modular imaging enclosure 602 in an opened state. Notably, the modular imaging enclosure 602 is shown as not having a top panel 108(T) or a bottom panel 108(B), although it could have a top panel 108(T) and/or a bottom panel 108(B) (See FIG. 1). In some situations, it may be sufficient to image an object within an enclosure 602 that is constructed exclusively from multiple side panels 108(S) coupled together, side-by-side. Thus, FIG. 6A shows an alternative panel configuration to that of FIG. 1 by the omission of a top panel 108(T) and a bottom panel 108(B). The door 604 of the enclosure 602 may be created by coupling a pair of side panels 108(S) together using a hinge(s), and leaving (at least temporarily) another pair of side panels 108(S) in a decoupled state. For example, in FIG. 6A, the sixth side panel 108(S)(6) and the seventh side panel 108(S)(7) may be coupled together using one or more hinges, while the first side panel 108(1) and the eighth side panel 108(8) may remain decoupled to allow the door 604 to swing open and closed. The remaining pairs of side panels 108(S) may be coupled together with a different type of connection mechanism, such as the bracket 110 and corresponding bolts, which were introduced with reference to FIG. 1.

Figure 6B:
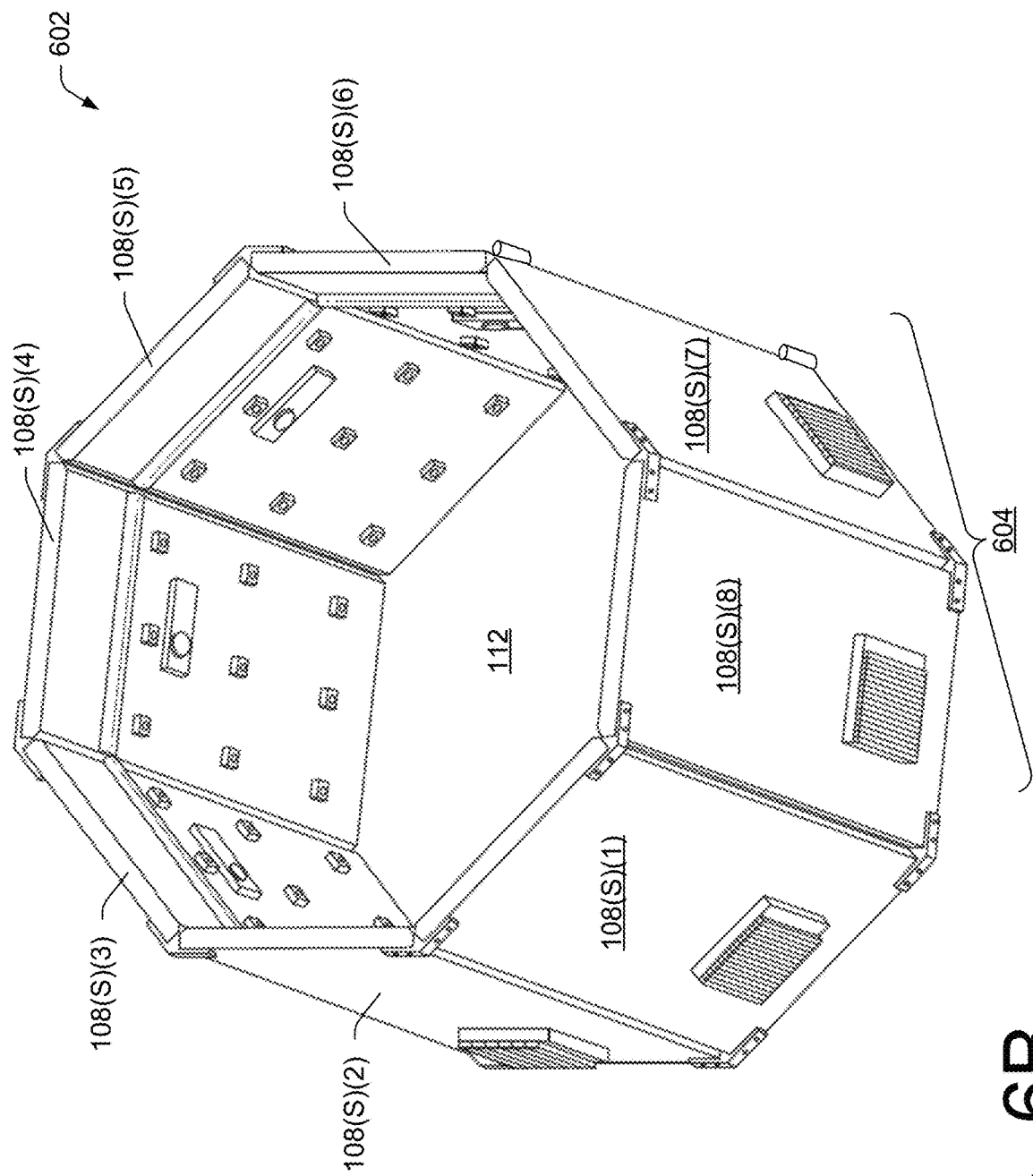
FIG. 6B illustrates an elevated angled view of the example modular imaging enclosure of FIG. 6A, FIG. 6B showing the door in a closed state.

In some embodiments, size and weight of the multiple side panels 108(S)(1)-(8) may be such that a human user could collapse the enclosure 602 by folding the side panels 108(S)(1)-(8) like an accordion into a stacked arrangement, and expand the enclosure 602 by unfolding the side panels 108(S)(1)-(8). In this scenario, the connection mechanism used between pairs of side panels 108(S) may be a hinge to allow for folding the side panels 108(S) so that they are stacked in a flat arrangement on top of one another in a collapsed state. This may also be how the panel configuration of FIG. 1 is implemented. In such a case, a human user may remove the top panel 108(T), collapse the side panels 108(S)(1)-(8), and then all of the panels could be stacked on top of one another, all without having to decouple pairs of the side panels 108(S). FIG. 6B illustrates an elevated angled view of the example modular imaging enclosure 602 of FIG. 6A, FIG. 6B showing the door 604 in a closed state, thereby creating the interior space 112.

Figure 7A:
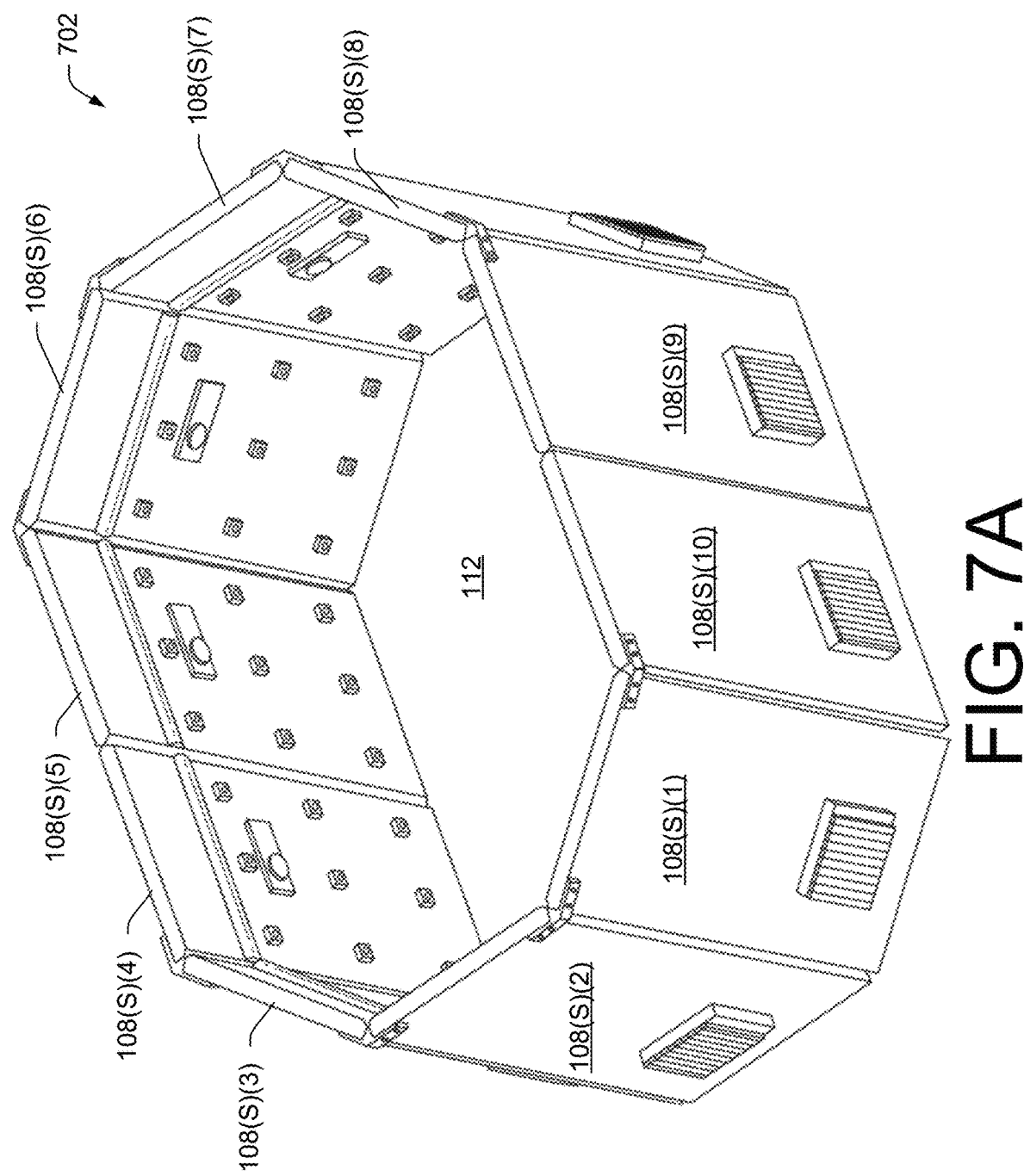
FIG. 7A illustrates an elevated angled view of an example modular imaging enclosure including ten side panels.
Figure 7B:
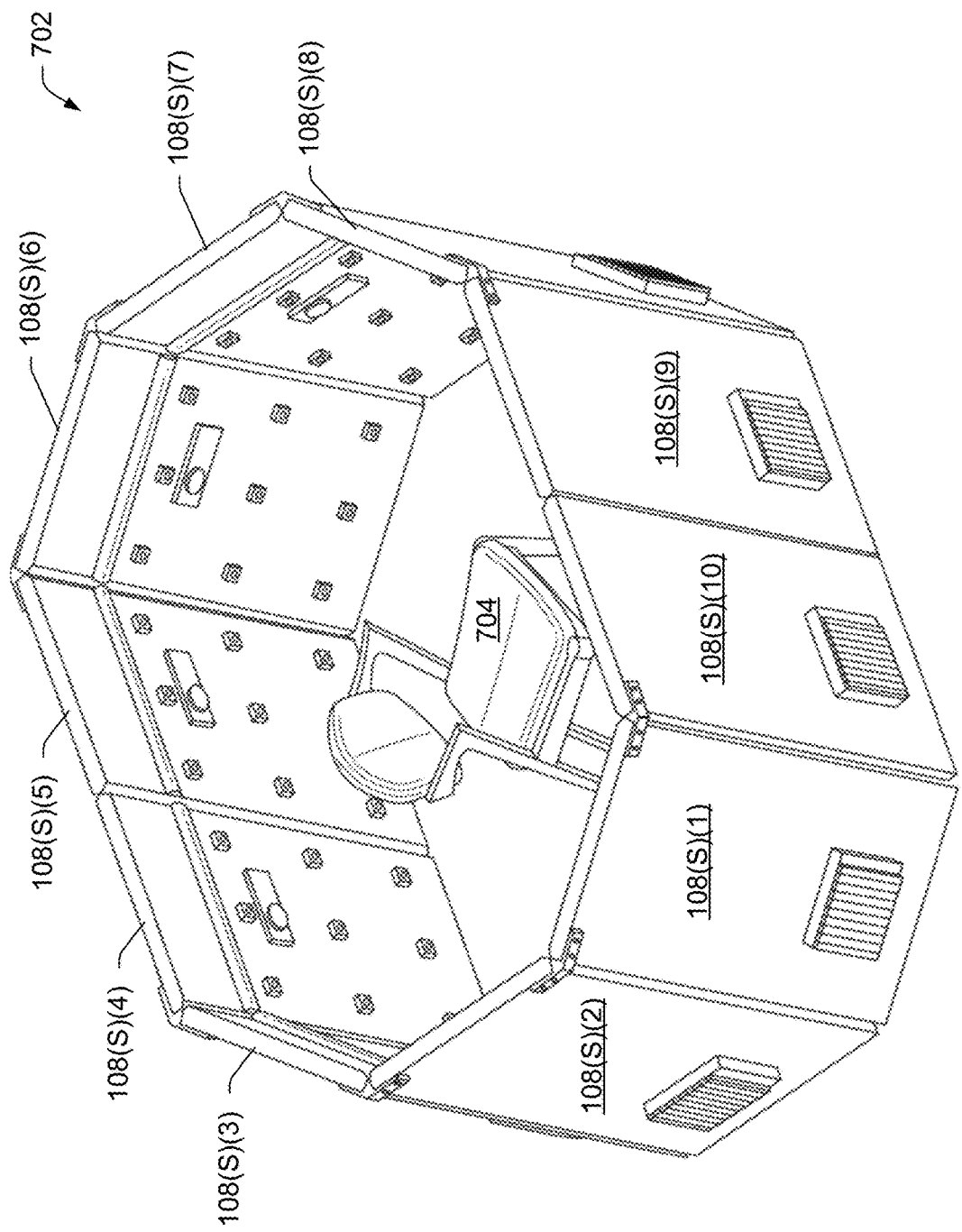
FIG. 7B illustrates the example modular imaging enclosure of FIG. 7A, FIG. 7B showing an object disposed in an interior space of the modular imaging enclosure that is to be imaged.

FIG. 7A illustrates an elevated angled view of an example modular imaging enclosure 702 including ten side panels 108(S)(1)-(10) coupled together, side-by-side. This panel configuration is larger than the eight-side panel configuration shown in FIGS. 1 and 6A/B. As such, the enclosure 702 may accommodate larger objects than the objects that can be imaged in the enclosures 102 and 602, such as coolers, large toys, wide pieces of furniture, etc. In fact, the transition from the enclosure 602 to the enclosure 702 illustrates the benefits of the modularity of the system. That is, a user may construct the enclosure 702 by simply adding two additional side panels 108(9) and 108(10) to the multiple side panels 108(1)-(8) of the enclosure 602. In this manner, the size of the enclosure can be increased or decreased, as needed. FIG. 7B illustrates the example modular imaging enclosure 702 of FIG. 7A, FIG. 7B showing an object 704 disposed in an interior space 112 of the modular imaging enclosure 702 that is to be imaged. The object 704 is shown by way of example as a chair. Accordingly, the modular imaging system 100 may be utilized with the enclosure 702 to image the object 704, such as a chair. This object 704 is merely exemplary to illustrate how an object 704 is positioned within the enclosure 702.

Figure 8:
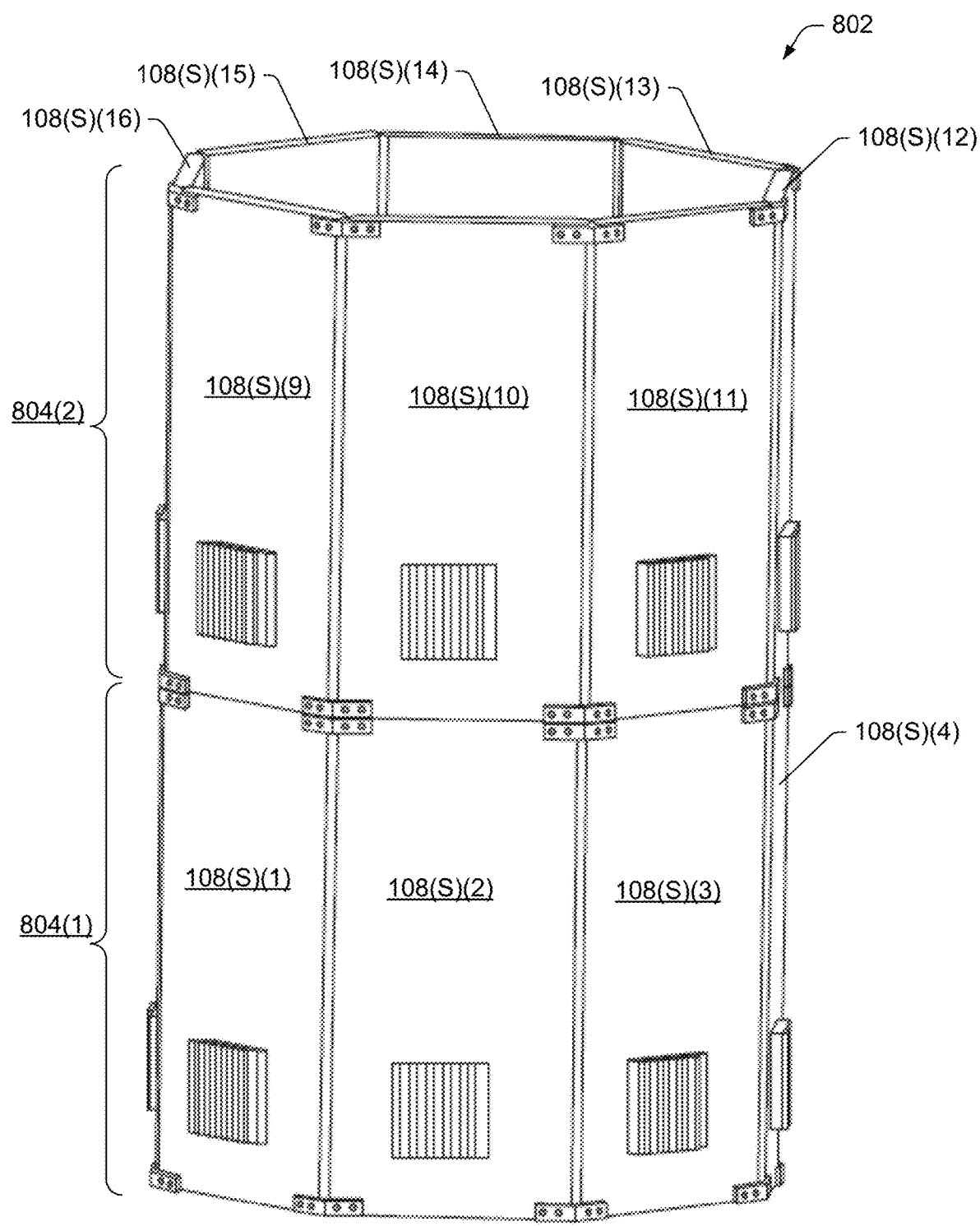
FIG. 8 illustrates a perspective view of an example modular imaging enclosure including a first level of eight side panels, and a second level of eight side panels stacked on top of the first level.

FIG. 8 illustrates a perspective view of an example modular imaging enclosure 802 including a first (e.g., bottom) level 804(1) of eight side panels 108(S)(1)-(8), and a second (e.g., top) level 804(2) of eight side panels 108(S)(9)-(16) stacked on top of the first level 804(1). The first level 804(1) of side panels 108(S)(1)-(8) may be coupled together at respective first side edges 211 of the first level 804(1) of side panels 108(S)(1)-(8). The second level 804(2) of side panels 108(S)(9)-(16) may have respective bottom edges 213 disposed on respective top edges 209 of the first level 804(1) of side panels 108(S)(1)-(8), and the second level 804(2) of side panels 108(S)(9)-(16) may also be coupled together at respective second side edges 211 of the second level 804(2) of side panels 108(S)(9)-(16). This stacked panel configuration allows for imaging objects that are relatively tall, such as a floor lamp, a shovel, a ladder, and/or a tall shelving unit. Although two levels 804(1) and 804(2) are shown in the example stacked panel configuration of FIG. 8, a stacked panel configuration may have any suitable number of levels 804, and any suitable number of side panels 108(S) in each level 804. Even in the stacked panel configuration, a doorway can be provided by a hinged coupling of adjacent side panels 108(S), the hinges being vertically aligned across the multiple levels 804 to provide a single door that swings open and closed.

The processes described herein are illustrated as a collection of blocks in a logical flow graph, which represent a sequence of operations that can be implemented by human users and/or in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 9:
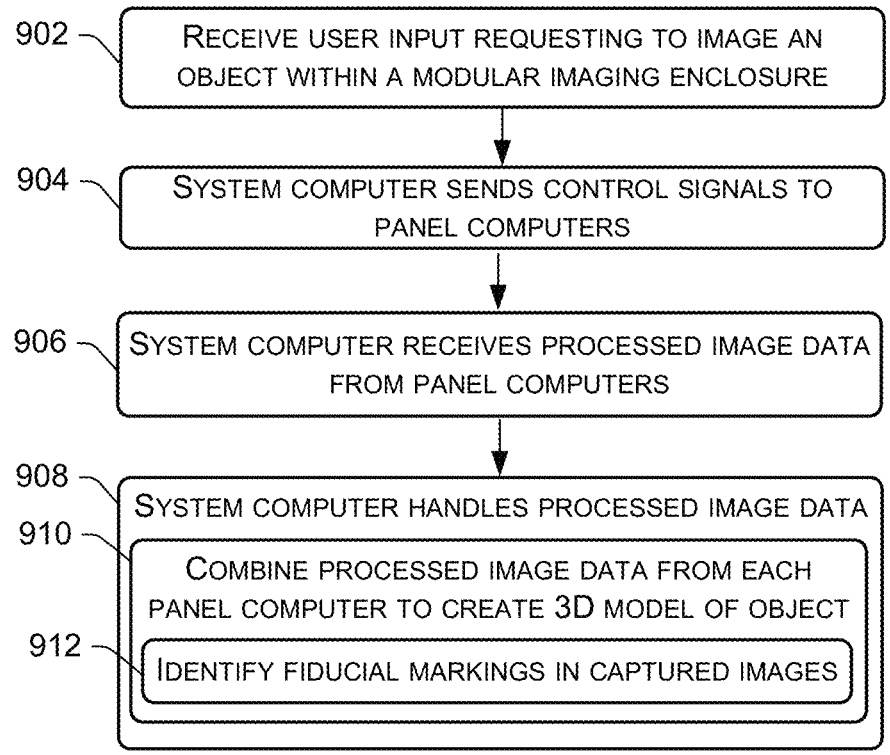
FIG. 9 illustrates a flow diagram of an example process for using a modular imaging system to obtain image data relating to an object.

FIG. 9 illustrates a flow diagram of an example process 900 for using a modular imaging system to obtain image data relating to an object. For discussion purposes, the process 900 is described with reference to the previous figures.

At 902, a component of the modular imaging system 100 may receive user input requesting to image an object within a modular imaging enclosure of the system 100. This user input may be received by an input device (e.g., mouse, keyboard, touchscreen, etc.) of a system computer 106, by a button or a control panel provided on or near the enclosure (e.g., a button or panel provided on one of the side panels), by voice command to a speech processing device, or any similar form of detecting user input. In some embodiments, the user input received at block 902 may specify a particular imaging mode of multiple imaging modes (e.g., 2D imaging mode, 3D imaging mode, etc.)

At 904, the system computer 106 may send, in response to receiving the user input, control signals to individual panels of the enclosure. For example, the system computer 106 may send, via the data connection(s) 124, a control signal to each side panel 108(S), a top panel 108(T), and/or a bottom panel 108(B). The control signal sent to an individual panel can be interpreted as a control signal instructing the panel to operate one or more of the electronic components of the panel, such as the light emitting element(s) 202, the cameras 204, the projector 206, and so on. In some embodiments, the control signals are sent in a pre-programmed sequence to control the individual panels to operate at different times. For instance, the control signals may cause panels of the enclosure to operate in sequence by capturing images one after the other, in pairs, or some other pattern.

At 906, the system computer 106 may receive processed image data from the multiple panel computers associated with respective side panels of the enclosure. For example, the system computer 106 may receive first processed image data from a first panel computer 210, second processed image data from a second panel computer 210, and so on, for any number of panel computers included on corresponding panels of the enclosure.

At 908, the system computer 106 handles the processed image data it received from multiple panel computers. The "handling" of image data may include, without limitation, organizing the image data into a plurality of data files (e.g., multiple 2D still images), storing image data, performing image processing operations (e.g., image touch-ups, removal of fiducial markings 116 from the captured images, etc.), compressing the image data, creating 360 spin data files, and/or any combination thereof.

As shown by sub-block 910, the handling of the processed image data at block 908 may include combining the processed image data from each panel computer to create a 3D model of the object disposed within the enclosure. As shown by sub-block 912, this may also include identifying one or more fiducial markings 116 within the captured images, and creating the 3D model based at least in part on the identified fiducial marking(s) 116. Identification of fiducial markings 116 within captured images can be done, in some cases, by the panel computer of a panel.

Figure 10:
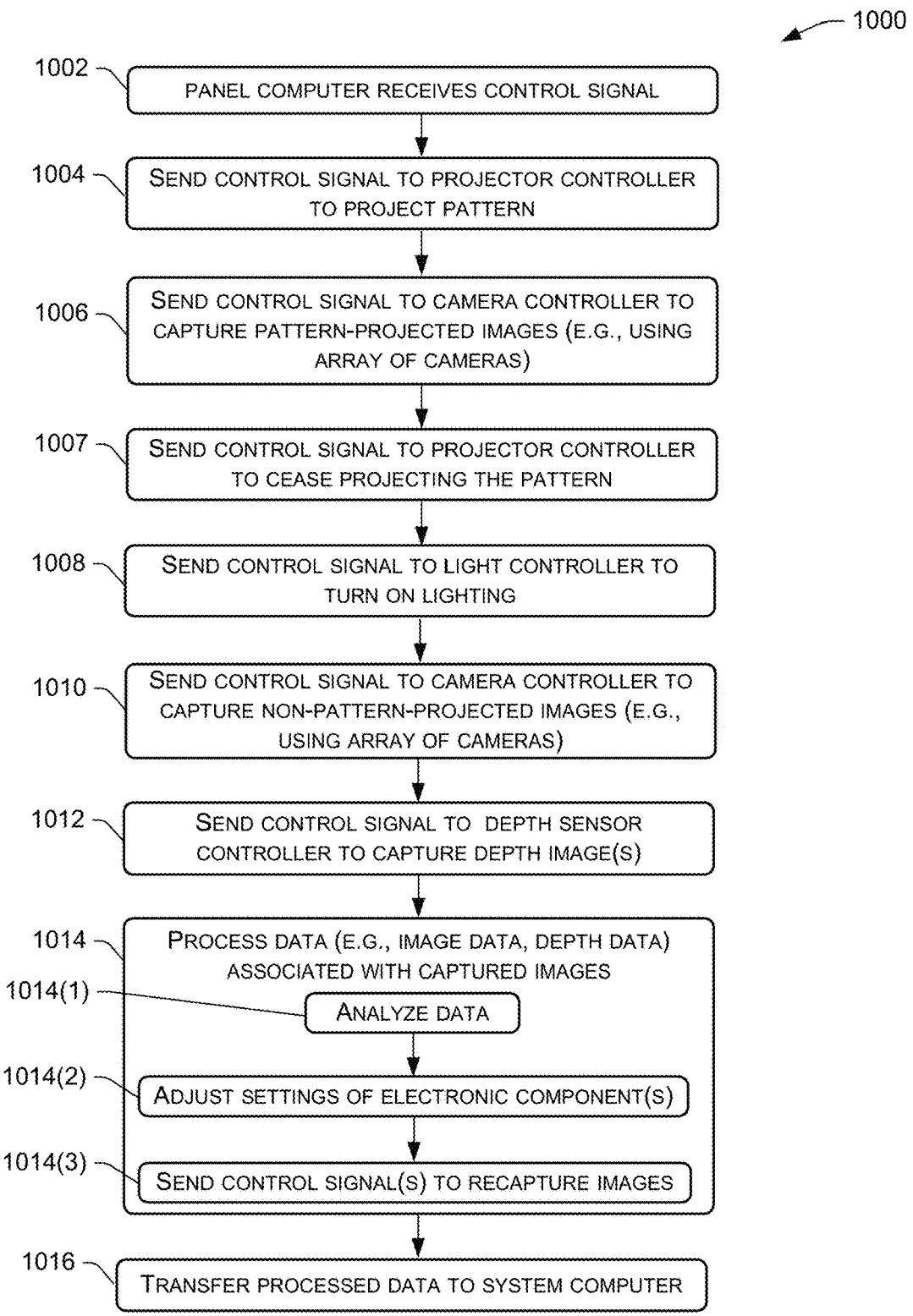
FIG. 10 illustrates a flow diagram of an example process for operating a panel of a modular imaging enclosure to obtain image data relating to an object.

FIG. 10 illustrates a flow diagram of an example process 1000 for operating a panel of a modular imaging enclosure to obtain image data relating to an object. For discussion purposes, the process 1000 is described with reference to the previous figures.

At 1002, a panel computer associated with a panel of a modular imaging enclosure may receive a control signal from a system computer 106, or from an adjacent panel that relayed a control signal originating from the system computer 106. This control signal may be one of the control signals sent by the system computer at block 904 of the process 900.

At 1004, the panel computer may send a control signal to a projector controller, the projector controller causing a projector(s) on the panel to project a pattern (e.g., onto an object disposed within the enclosure). The lighting within the enclosure may be turned off during this operation(s) at block 1004.

At 1006, the panel computer may send a control signal to a camera controller, the camera controller causing an array of cameras on the panel to capture images while the pattern is projected on the object. These images are referred to herein as "pattern-projected images." In some embodiments, the camera controller causes the array of cameras to capture images according to a pre-programmed sequence (e.g., sequentially capturing images with each camera, one after another, capturing images simultaneously with pairs or groups of cameras, etc.).

At 1007, the panel computer may send a control signal to the projector controller to cease projecting the pattern after capturing the pattern-projected images. This may include turning off the projector.

At 1008, the panel computer may send a control signal to a light controller, the light controller causing one or more light emitting elements on the panel to emit the light (i.e., turn on). In some embodiments, the control signal may specify a value that adjusts an amount of the light to a particular amount.

At 1010, the panel computer may send a control signal to the camera controller, the camera controller causing the array of cameras on the panel to capture images of the object. These images can be considered to be "non-pattern-projected images" because the projector is not projecting the pattern during capture of these images. In some embodiments, the camera controller causes the array of cameras to capture images according to a pre-programmed sequence (e.g., sequentially capturing images with each camera, one after another, capturing images simultaneously with pairs or groups of cameras, etc.).

At 1012, the panel computer may send a control signal to a depth sensor controller, the depth sensor controller causing a depth sensor(s) on the panel to capture one or more depth images.

At 1014, the panel computer may process data associated with the captured images. This data may include image data associated with the non-pattern-projected images, image data associated with the pattern-projected images, depth data associated with the depth image(s). Various image processing operations, as described herein, may be performed at block 1014. In some embodiments, the sub-blocks 1014(1), 1014(2), and 1014(3) may be performed as part of a real-time recapture process to optimize the output.

At 1014(1), the panel computer may analyze the data associated with the captured images. These captured images may be considered to be initial images captured by the cameras of the panel. The analysis at 1014(1) may use various techniques to assess the quality of the captured images, such as analysis pertaining to quantitative aspects of light level, hue, contrast, and/or other imaging parameters that can be quantitatively expressed for purposes of the analysis at sub-block 1014(1). Part of the analysis at sub-block 1014(1) may be to determine a current parameter value(s) and a target parameter value(s), and to determine how to adjust settings of one or more of the electronic components of the panel to achieve the target parameter value(s) in recaptured images.

At 1014(2), the panel computer may adjust one or more settings of one or more of the electronic components of the panel based on a result of the analysis at sub-block 1014(1). For example, the panel computer may send a control signal to a light controller to adjust settings of the light emitting element(s) of the panel by adjusting the amount of light and/or the color of the light emitted by the light emitting element(s). The panel computer may, additionally or alternatively, send a control signal to a camera controller to adjust settings of the cameras 204 by adjusting the FOV and/or other camera settings that are adjustable. As another example, the panel computer may, additionally or alternatively, send a control signal to a projector controller to adjust settings of the projector 204, and/or a control signal to a depth sensor controller to adjust settings of the depth sensor 312, etc.

At 1014(3), the panel computer may send one or more control signals to the various controllers (e.g., to the camera controller), the controllers causing the corresponding electronic components to operate as part of a recapture operation (e.g., causing the array of cameras on the panel to recapture images of the object). These captured images can be considered to be recaptured images captured by the cameras of the panel. Because the capture sequence can be done very quickly (e.g., within milliseconds), the analysis, settings adjustment, and recapture before transferring the data to the system computer may enable real-time optimization in terms of the quality of the output data without noticeable latency.

At 1016, the panel computer may transfer (or send, via the data connection 124) the processed data (e.g., processed image data, processed depth data, etc.) to the system computer 106. In some embodiments, a projector and/or a depth sensor may not be used during operation of the panel. As such, the process 1000, in a simplified form, may omit blocks 1004, 1006, and/or 1012.

Figure 11:
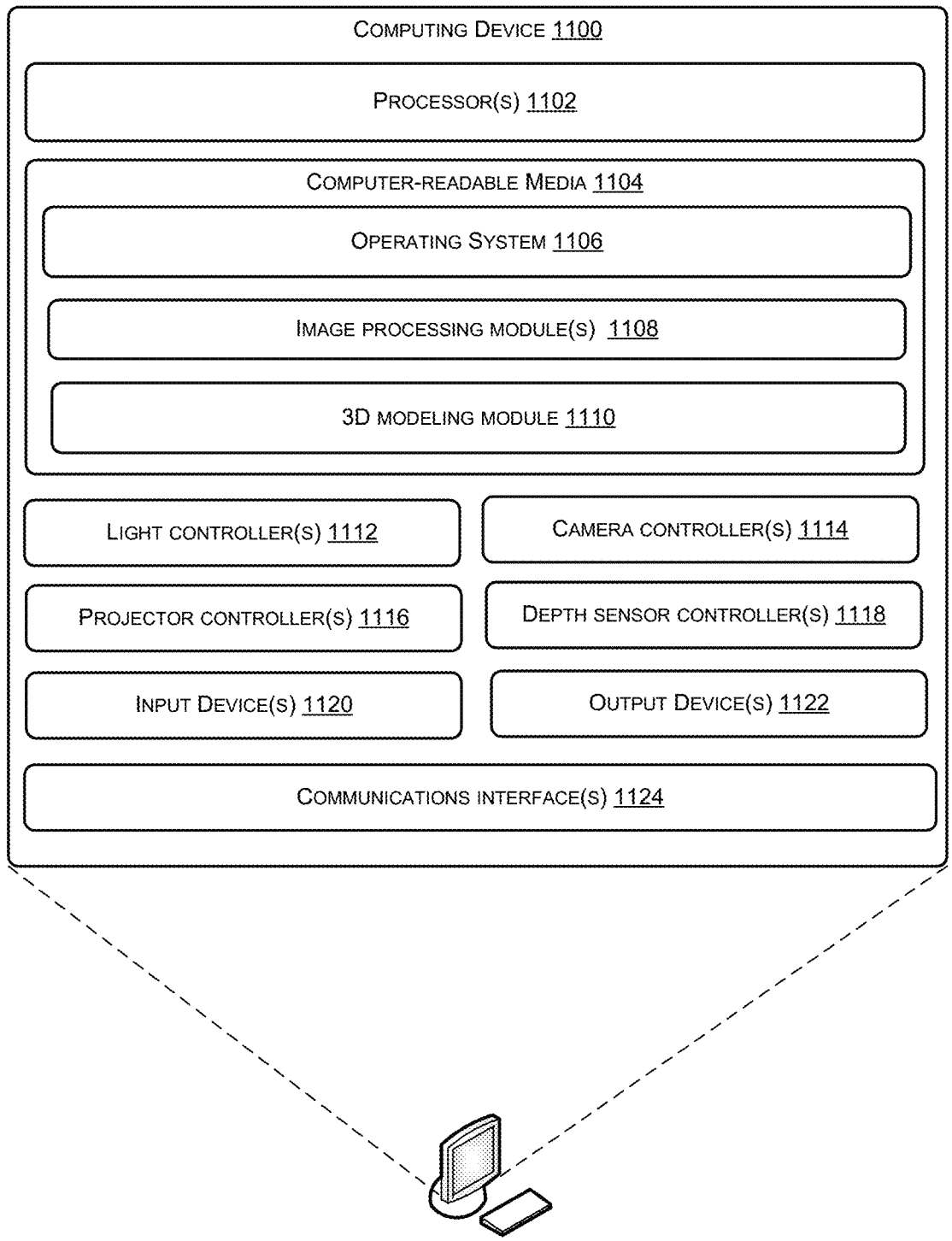
FIG. 11 illustrates an example computing device with example components that may be included in any of the computers described herein.

FIG. 11 illustrates an example computing device 1100 with example components that may be included in any of the computers described herein, such as the system computer 106 and/or the panel computers 210. Implementations of the computing device 1100 may include, without limitation, a personal computer (PC), a notebook, a tablet, a smart phone, or any combination thereof. These types of computing devices, however, are merely examples and not intended to be limiting, as the techniques described in this disclosure may be used in essentially any device that has an ability to operate peripheral electronic components, process and store image data, depth data, or any other type of data, send/receive data over a communications interface, etc.

In the illustrated implementation, the computing device 1100 includes one or more processors 1102 and computer-readable media 1104. In some implementations, the processors(s) 1102 may include a central processing unit (CPU), a graphics processing unit (GPU), both CPU and GPU, a microprocessor, a digital signal processor, an image processor, or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1102 may possess its own local memory, which also may store program modules, program data, and/or one or more operating systems.

The computer-readable media 1104 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1104 may be implemented as computer-readable storage media ("CRSM"), which may be any available physical media accessible by the processor(s) 1102 to execute instructions stored on the memory 1104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1102.

Several modules such as instruction, datastores, and so forth may be stored within the computer-readable media 1104 and configured to execute on the processor(s) 1102. A few example functional modules are shown as being stored in the computer-readable media 1104 and executed on the processor(s) 1102, although the same functionality may alternatively be implemented in hardware, firmware, or as a system on a chip (SOC). An operating system module 1106 may be configured to manage hardware within and coupled to the computing device 1100 for the benefit of other modules. The computing device 1100 may further including, in some instances, an image processing module 1108, and/or a 3D modeling module, which may individually, or in combination, carry out the operations and techniques described herein.

The computing device 1100 may further include a light controller(s) 1112, a camera controller(s) 1114, a projector controller(s) 1116, and/or a depth sensor controller(s) 1118, as described herein. In general, the light controller(s) 1112 may be configured to receive control signals and cause the one or more light emitting elements 202 of a panel to emit the light, cease emitting the light, adjust an amount of the light, and/or adjust a color (e.g., color temperature) of the light emitted by the one or more light emitting elements 202 based on the control signal. In some embodiments, the adjustment of the amount of light may be based on an automated detection of the ambient lighting conditions within the enclosure and/or based on a reflectiveness of the material of an object disposed within the enclosure (e.g., using a light sensor). The camera controller(s) 1114 may be configured to cause the array of cameras 204 of a panel to capture images (e.g., non-pattern-projected images, pattern-projected images, etc.), sometimes according to a pre-programmed sequence, cause individual cameras 204 to change their FOV, etc. The projector controller(s) 1116 may be configured to cause the projector 206 of a panel to project a pattern (e.g., while light is not emitted within the enclosure). The depth sensor controller(s) 1118 may be configured to cause the depth sensor 312 of a panel to capture one or more depth images (or depth data).

Generally, the computing device 1100 has input devices 1120 and output devices 1122. The input devices 1120 may include, without limitation, a keyboard, keypad, mouse, touch screen, joystick, control buttons, a microphone(s), etc. The output device(s) 1122 may include, without limitation, a display(s), a light element (e.g., LED), a speaker(s), a vibrator to create haptic sensations, or the like.

The computing device 1100 may further include a communications interface 1124, which may operate wirelessly or using a wired data connection to communicate data over a network, such as over the data connection 124 and/or the network 126. A universal serial bus (USB), ethernet or a broadband connection, Transmission Control Protocol/Internet Protocol (TCP/IP) protocol connection are example implementations of the communications interface 1124 to facilitate a wired connection to a network, or a plug-in network device that communicates with other wireless networks. The communications interface 1124 may additionally, or alternatively, include a wireless unit configured to implement various wireless and/or IoT technologies, such as Bluetooth® protocol, Bluetooth Low Energy (BLE) protocol, ZigBee® protocol, Z-Wave® protocol, WiFi protocol, and/or any other type of protocol usable to communicate wirelessly between electronic devices in an environment, including those that do and/or do not rely data transmission over a wide area network.

Although the techniques have been described in language specific to structural features and/or methodological acts, it is to be understood that the appended claims are not necessarily limited to the features or acts described. Rather, the features and acts are described as example implementations of such techniques.

Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A modular imaging system, comprising:
   a modular imaging enclosure comprising multiple panels configured to be coupled together to define an interior space of the modular imaging enclosure, wherein at least a subset of the multiple panels are imaging panels, a panel of the subset including:
   one or more light emitting elements mounted on an inner face of the panel and configured to emit light within the interior space;
   an array of cameras mounted on the inner face of the panel and configured to capture a plurality of images of an object disposed within the interior space of the modular imaging enclosure; and
   a panel computer mounted on the panel and configured to at least process image data associated with the plurality of images;
   a power supply configured to supply power to at least the one or more light emitting elements, the array of cameras, and the panel computer; and
   a system computer configured to at least:
   receive processed image data from the panel computer;
   receive additional processed image data from at least one additional panel computer of another panel of the subset; and
   combine at least the processed image data and the additional processed image data to create a three-dimensional model of the object.

2. The modular imaging system of claim 1, wherein the multiple panels include:
   multiple side panels configured to be coupled together at respective side edges of the multiple side panels, each panel of the subset being one of the multiple side panels;
   a top panel configured to be disposed on respective top edges of the multiple side panels, the top panel having a camera mounted on an inner face of the top panel and configured to capture one or more additional images of the object disposed within the interior space of the modular imaging enclosure; and
   a bottom panel configured to be disposed opposite the top panel, the bottom panel having:
   one or more additional light emitting elements configured to emit second light, and
   a diffusing material disposed over the one or more additional light emitting elements to diffuse the second light.

3. The modular imaging system of claim 1, wherein:
   a first pair of the multiple panels are configured to be coupled together using a connection mechanism; and
   a second pair of the multiple panels are configured to be coupled together using one or more hinges, different from the connection mechanism, to create a doorway into the interior space of the modular imaging enclosure.

4. The modular imaging system of claim 1, wherein the panel computer is further configured to send a control signal to a light controller, the light controller configured to cause the one or more light emitting elements to at least one of emit the light, cease emitting the light, adjust an amount of the light, or adjust a color of the light emitted by the one or more light emitting elements.

5. A panel that is usable to construct a modular imaging enclosure by coupling the panel to at least additional panels, the panel comprising:

one or more light emitting elements mounted on an inner face of the panel and configured to emit light;
a first camera mounted on the inner face of the panel;
a second camera mounted on the inner face of the panel, the second camera and the first camera being coplanar and spaced from each other; and
a panel computer mounted on the panel and configured to at least:
send a first control signal to a camera controller to cause the first camera to capture one or more initial first images and the second camera to capture one or more initial second images;
analyze first image data associated with the one or more initial first images and the one or more initial second images;
adjust, based at least in part on a result of analyzing the first image data, settings of at least one of the one or more light emitting elements, the first camera, or the second camera to obtain adjusted settings;
send a second control signal to the camera controller to cause the first camera to capture one or more subsequent first images and the second camera to capture one or more subsequent second images with the adjusted settings; and
process second image data associated with the one or more subsequent first images and the one or more subsequent second images.

6. The panel of claim 5, wherein the first camera and the second camera are included in an array of nine cameras that further includes a third camera, a fourth camera, a fifth camera, a sixth camera, a seventh camera, an eighth camera, and a ninth camera, wherein the array of nine cameras are mounted on the inner face of the panel in an arrangement of three rows and three columns, each row having three cameras, and each column having three cameras.

7. The panel of claim 5, wherein the first camera and the second camera are included in an array of cameras, and wherein the one or more light emitting elements are mounted on the inner face of the panel above the array of cameras within a top half of the inner face of the panel.

8. The panel of claim 5, wherein the one or more light emitting elements comprises a strip of light emitting diodes (LEDs) that runs horizontally along the inner face of the panel, the panel further comprising a diffusing material disposed over the strip of LEDs to diffuse the light.

9. The panel of claim 5, further comprising a projector mounted on the inner face of the panel and configured to project a pattern on an object disposed within an interior space of the modular imaging enclosure, the interior space defined by the panel and the additional panels when the panel is coupled to the additional panels.

10. The panel of claim 9, wherein the panel computer is further configured to:
send a third control signal to a projector controller, the projector controller configured to cause the projector to project the pattern; and
send a fourth control signal to the camera controller, the camera controller configured to cause the first camera to capture the one or more subsequent first images and the second camera to capture the one or more subsequent second images while the pattern is projected.

11. The panel of claim 5, wherein the panel computer is further configured to:
send a third control signal to a light controller, the light controller configured to cause the one or more light emitting elements to emit the light; and
send a fourth control signal to the camera controller, the camera controller configured to cause the first camera to capture the one or more subsequent first images and the second camera to capture the one or more subsequent second images while the light is emitted.

12. The panel of claim 5, further comprising a depth sensor mounted on the inner face of the panel and configured to capture depth data, wherein the panel computer is further configured to process the depth data.

13. The panel of claim 5, wherein the camera controller is further configured to cause, based at least in part on the second control signal, at least the first camera and the second camera to capture the one or more subsequent first images and the one or more subsequent second images according to a pre-programmed sequence.

14. The panel of claim 5, wherein the panel computer is further configured to send a third control signal to a light controller, the light controller configured to cause the one or more light emitting elements to at least one of emit the light, cease emitting the light, adjust an amount of the light, or adjust a color of the light.

15. A modular imaging system, comprising:
a modular imaging enclosure comprising multiple panels configured to be coupled together to define an interior space of the modular imaging enclosure, wherein a panel of the multiple panels includes:
one or more light emitting elements mounted on an inner face of the panel and configured to emit light,
a first camera mounted on the inner face of the panel and configured to capture one or more first images,
a second camera mounted on the inner face of the panel and configured to capture one or more second images, and
a panel computer mounted on the modular imaging enclosure and configured to at least process image data associated with the one or more first images and the one or more second images,
a power supply configured to supply power to the one or more light emitting elements, the first camera, the second camera, and the panel computer; and
a system computer configured to at least:
receive processed image data from the panel computer;
receive additional processed image data from at least one additional panel computer of another panel of the multiple panels; and
combine at least the processed image data and the additional processed image data to create a three-dimensional model of an object.

16. The modular imaging system of claim 15, wherein the multiple panels include:
eight rectangular side panels configured to be coupled together at respective side edges of the eight rectangular side panels;
a top panel configured to be disposed on respective top edges of the eight rectangular side panels; and
a bottom panel configured to be disposed opposite the top panel to form the modular imaging enclosure having a shape of an octagonal prism, and
wherein the panel is at least one of the top panel or one of the eight rectangular side panels.

17. The modular imaging system of claim 15, wherein the multiple panels include:
multiple side panels configured to be coupled together at respective side edges of the multiple side panels, the panel being a side panel of the multiple side panels;
a top panel configured to be disposed on respective top edges of the multiple side panels, the top panel having a third camera mounted on an inner face of the top panel and configured to capture one or more third images; and a bottom panel configured to be disposed opposite the top panel, the bottom panel having:

one or more additional light emitting elements configured to emit second light, and a diffusing material disposed over the one or more additional light emitting elements to diffuse the second light.

18. The modular imaging system of claim 15, wherein the multiple panels include:

multiple side panels configured to be coupled together at respective side edges of the multiple side panels, the panel being a side panel of the multiple side panels;

a top panel configured to be disposed on respective top edges of the multiple side panels, the top panel having a third camera mounted on an inner face of the top panel and configured to capture one or more third images; and a bottom panel configured to be disposed opposite the top panel, the bottom panel having one or more fiducial markings on an inner face of the bottom panel, wherein at least one of the panel computer or the system computer is configured to process the image data by identifying the one or more fiducial markings within at least one of the one or more first images or the one or more second images.

19. The modular imaging system of claim 18, wherein one or more additional fiducial markings are provided on each of the multiple side panels, and wherein at least one of the panel computer or the system computer is further configured to process the image data to identify the one or more additional fiducial markings.

20. The modular imaging system of claim 15, wherein the multiple panels include multiple side panels configured to be coupled together at respective side edges of the multiple side panels, the panel being a side panel of the multiple side panels, and wherein individual pairs of the multiple side panels are configured to be coupled together using a connection mechanism.

21. The modular imaging system of claim 15, wherein the multiple panels include multiple side panels configured to be coupled together at respective side edges of the multiple side panels, the panel being a side panel of the multiple side panels, and wherein a pair of the multiple side panels are configured to be coupled together with one or more hinges to create a doorway into the interior space of the modular imaging enclosure.

22. The modular imaging system of claim 15, wherein the multiple panels include:

a first level of side panels configured to be coupled together at respective first side edges of the first level of side panels; and a second level of side panels configured to be stacked on top of the first level of side panels by disposing respective bottom edges of the second level of side panels atop respective top edges of the first level of side panels, the second level of side panels configured to be coupled together at respective second side edges of the second level of side panels, and wherein the panel is a side panel of at least one of the first level of side panels or the second level of side panels.

23. The modular imaging system of claim 15, wherein:

the panel is an imaging panel configured to capture the one or more first images and the one or more second images;

the one or more light emitting elements are one or more first light emitting elements; and a second panel of the multiple panels is a lighting panel that omits cameras and includes one or more second light emitting elements mounted on an inner face of the second panel and configured to emit second light.

24. The modular imaging system of claim 15, wherein the power supply is configured to be connected to the panel via a power cable, and wherein the power is to be supplied to electronic components of remaining panels of the multiple panels via daisy-chained power connections between the multiple panels.

25. The modular imaging system of claim 15, wherein the panel further comprises a projector mounted on the inner face of the panel and configured to project a pattern on the object disposed within the interior space of the modular imaging enclosure.

* * * * *